(12) United States Patent
Aoki et al.

(10) Patent No.: US 11,928,990 B2
(45) Date of Patent: Mar. 12, 2024

(54) DISPLAY SYSTEM

(71) Applicant: Japan Display Inc., Tokyo (JP)

(72) Inventors: Yoshiro Aoki, Tokyo (JP); Kentaro Okuyama, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 435 days.

(21) Appl. No.: 17/192,063

(22) Filed: Mar. 4, 2021

(65) Prior Publication Data
US 2021/0192994 A1 Jun. 24, 2021

Related U.S. Application Data

(63) Continuation of application No. PCT/JP2019/030935, filed on Aug. 6, 2019.

(30) Foreign Application Priority Data

Sep. 4, 2018 (JP) .................................. 2018-165372

(51) Int. Cl.
*G09G 3/00* (2006.01)
*G02F 1/1334* (2006.01)
*G02F 1/1343* (2006.01)
*G02F 1/137* (2006.01)
*G02F 1/167* (2019.01)
*G02F 1/1676* (2019.01)
(Continued)

(52) U.S. Cl.
CPC ......... *G09G 3/001* (2013.01); *G02F 1/13347* (2021.01); *G02F 1/134336* (2013.01); *G02F 1/137* (2013.01); *G02F 1/167* (2013.01); *G02F 1/1676* (2019.01); *G02F 1/1685* (2019.01); *G03B 21/62* (2013.01); *G09G 5/38* (2013.01)

(58) Field of Classification Search
CPC ............. G02F 1/13347; G02F 1/13756; G02F 1/1685; G02F 1/1676; G02F 1/137; G02F 1/167; G02F 1/134336; G03B 21/62; G03B 21/14; G03B 21/60; G03B 21/00; G02B 5/02; H04N 5/57; H04N 5/74; G09G 3/001; G09G 3/002; G09G 3/003; G09G 5/12; G09G 5/38; G09G 5/00
USPC ......................................................... 345/667
See application file for complete search history.

(56) References Cited

U.S. PATENT DOCUMENTS

2011/0205456 A1   8/2011 Mizoguchi et al.
2014/0333899 A1*  11/2014 Smithwick ............. G03B 21/00
                                                    353/10

FOREIGN PATENT DOCUMENTS

JP   2011-175110 A     9/2011
JP   2011175110 A *    9/2011 ........... G02B 26/085
(Continued)

OTHER PUBLICATIONS

International Search Report and Written Opinion dated Oct. 21, 2019, received for PCT Application PCT/JP2019/030935 Filed on Aug. 6, 2019, 36 pages including English Translation.

*Primary Examiner* — Wesner Sajous
(74) *Attorney, Agent, or Firm* — XSENSUS LLP

(57) ABSTRACT

According to one embodiment, a display system includes a transparent screen that is capable of switching a light scattering degree, a projector, and a controller that controls interlocking driving of the projector and the screen. The controller drives the screen and controls a light scattering degree of at least part of an area, of the screen, in which the image is projected during a period in which the projector is driven and an image is projected on the screen.

14 Claims, 19 Drawing Sheets

(51) Int. Cl.
    *G02F 1/1685*    (2019.01)
    *G03B 21/62*    (2014.01)
    *G09G 5/38*    (2006.01)
    *H04N 5/57*    (2006.01)

(56) References Cited

FOREIGN PATENT DOCUMENTS

| | | | | | |
|---|---|---|---|---|---|
| JP | 2015-79201 | A | * | 4/2015 | ............ G03B 21/00 |
| JP | 2015-79201 | A | | 4/2015 | |
| JP | 2017-28430 | A | * | 7/2015 | ............ G03B 15/00 |
| JP | 2017-28430 | A | | 2/2017 | |
| JP | 2017-223912 | A | | 12/2017 | |
| JP | 2017223912 | A | * | 12/2017 | ............ G03B 21/10 |
| JP | 2018-21975 | A | | 2/2018 | |

* cited by examiner

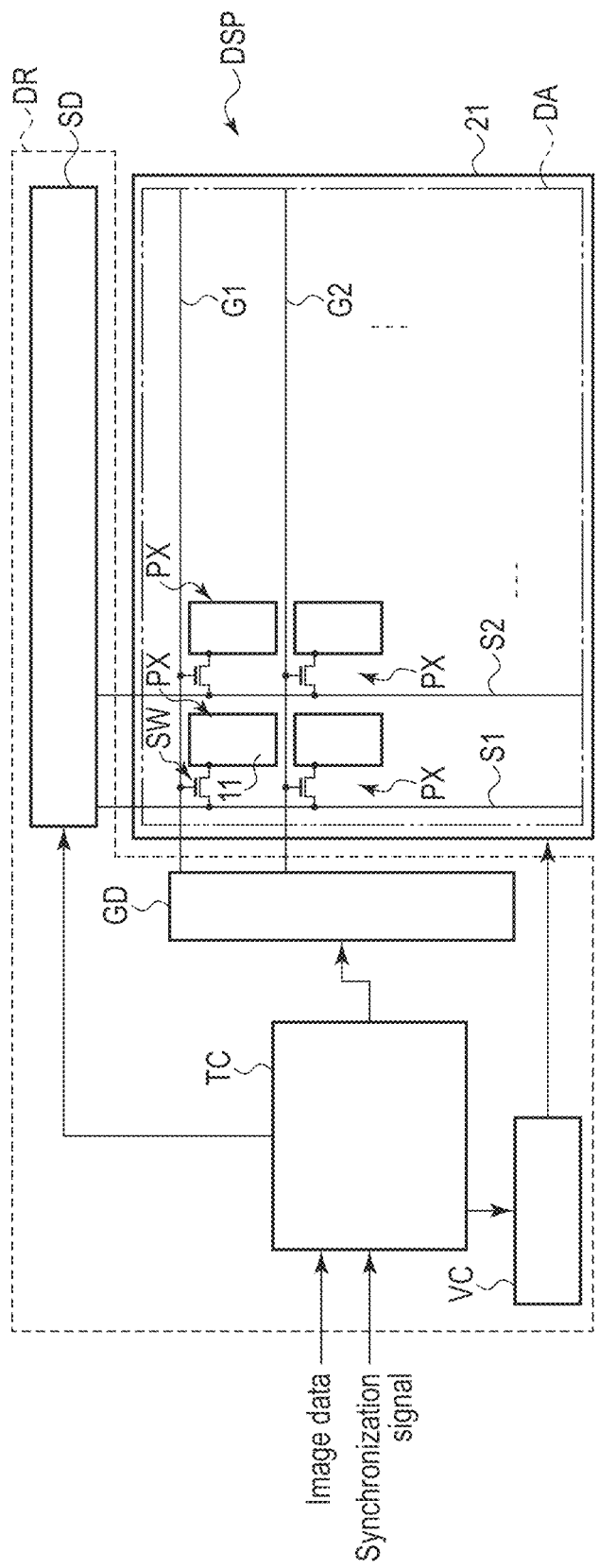
F I G. 4

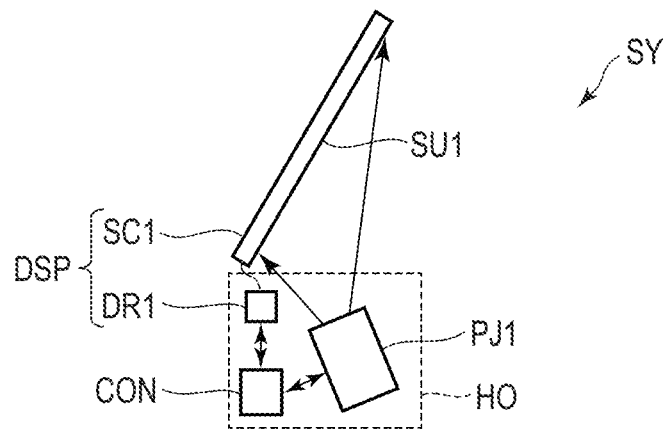
F I G. 17
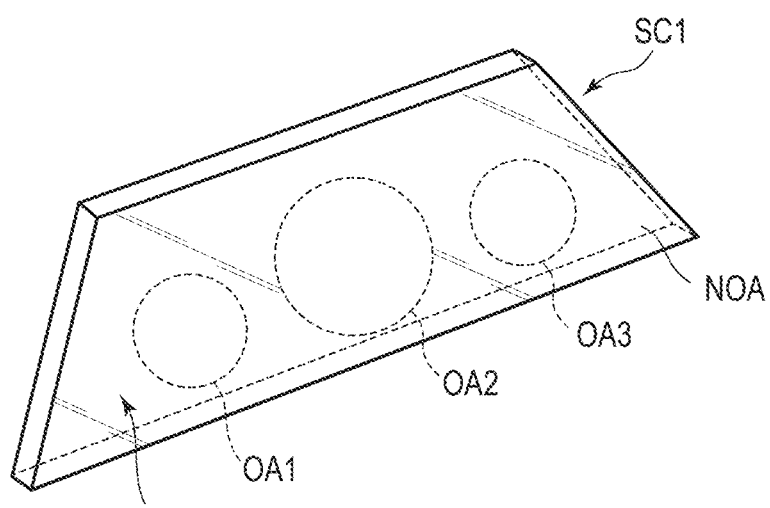
F I G. 18

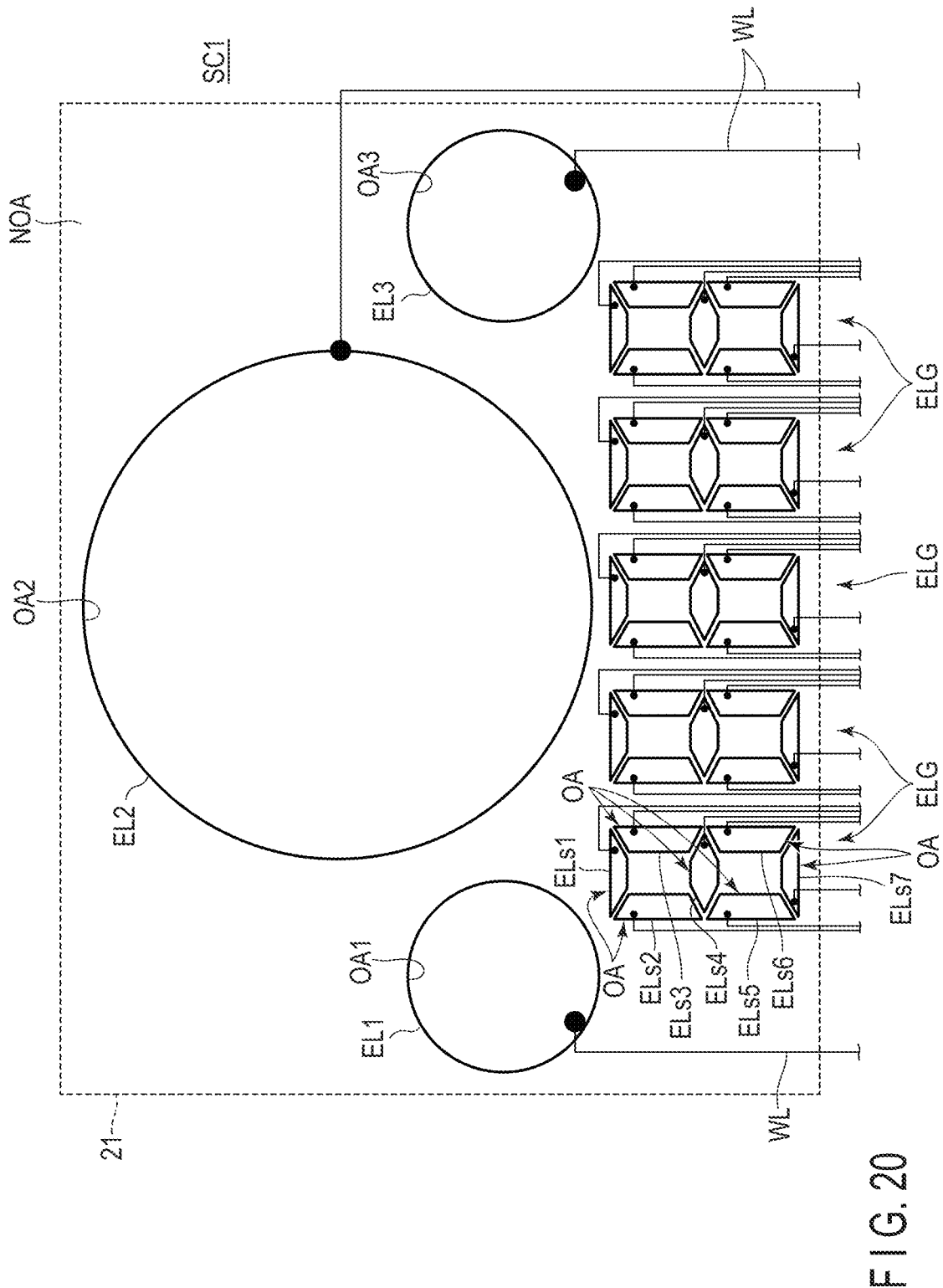
F I G. 20

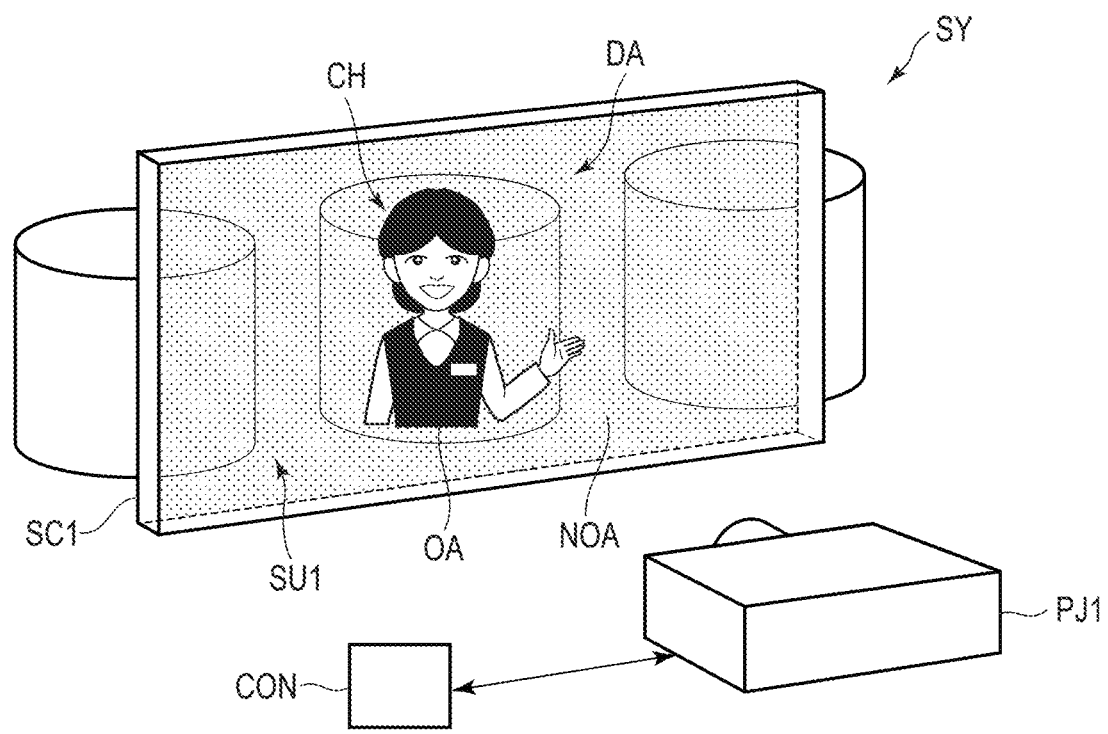
F I G. 26
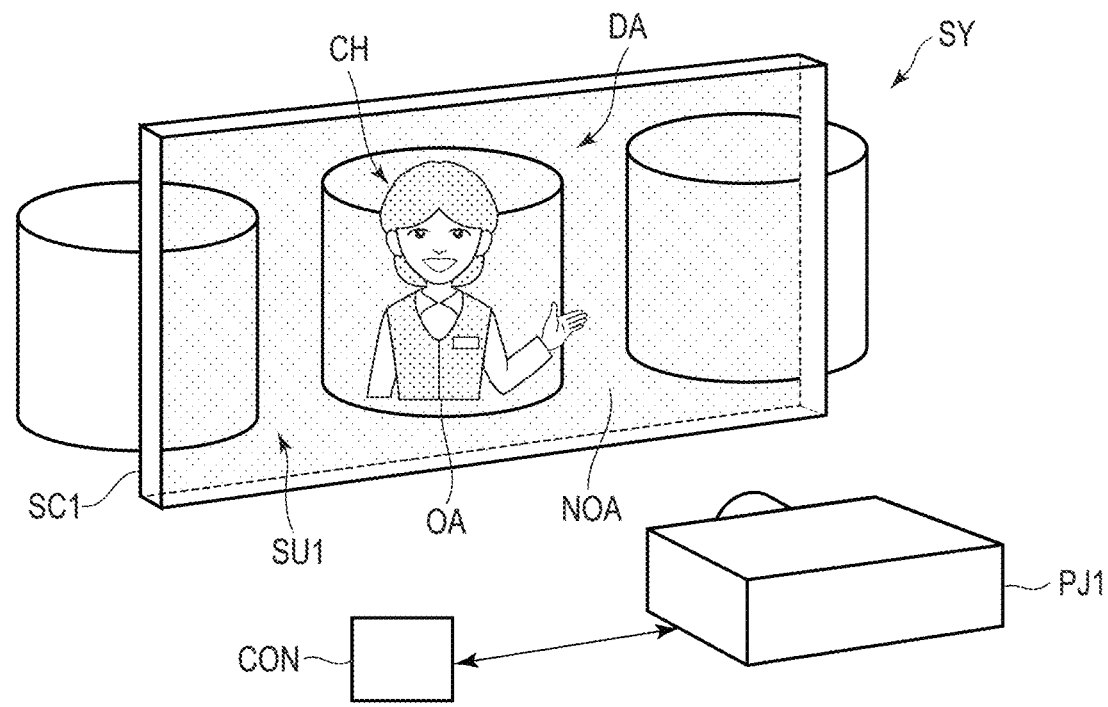
F I G. 27

DISPLAY SYSTEM

CROSS-REFERENCE TO RELATED APPLICATIONS

This application is a Continuation Application of PCT Application No. PCT/JP2019/030935, filed Aug. 6, 2019 and based upon and claiming the benefit of priority from Japanese Patent Application No. 2018-165372, filed Sep. 4, 2018, the entire contents of all of which are incorporated herein by reference.

FIELD

Embodiments described herein relate generally to a display system.

BACKGROUND

With the rapid spread of large-scale liquid crystal display devices in recent years, examples of applying liquid crystal display devices as display devices for signage are spreading. Since the display contents can be freely changed at any timing, it is possible to support various contents including moving images as opposed to the conventional signage, and these are rapidly spreading. However, it has been pointed out that a large scale display device has a display surface occupying a very large area in a space, and the display device itself is an object that gives a feeling of oppression, especially when it is in a non-display state. For this reason, for example, there is a limit to the installation of a large scale display device in a public space such as a park. On the other hand, a proposal has been made to utilize the transparent screen as it is as a display device. For example, by mixing a light-scattering substance with a base material such as transparent acrylic, it has a certain degree of transparency and light-scattering property at the same time, and by projecting a video from an optical projection device, a transparent display device can be realized.

However, in the above method, there is a trade-off between transparency and light scattering degree. When the projected image is intended to be firmly seen, the transparency will decrease and it will be in the same state as the screen of a normal projection type display device, and when the transparency is intended to be increased, the projected video will be difficult to see, so that this is not a realistic solution especially in the case of a display device in direct sunlight outdoors. For this reason, the screen mixed with the above-mentioned light-scattering substance is often installed on a dark stage indoors such as a theater, and is often used mainly for entertainment purposes such as concerts.

BRIEF DESCRIPTION OF THE DRAWINGS

FIG. 4 is a diagram showing the main components of the light scattering device shown in FIG. 1.

FIG. 17 is a cross-sectional view showing a display system according to the fourth embodiment.

FIG. 18 is a perspective view showing the screen, and is a diagram showing a state in which a first target area, a second target area, and a third target area of the screen are switched to the scattering state, and the non-target area of a screen is set in the transparent state.

FIG. 20 is a plan view showing a first substrate of a screen of a display system according to the fifth embodiment, and is a diagram showing various electrodes and a plurality of wiring lines.

FIG. 26 is a perspective view showing a screen and a projector of a display system according to the comparative example 1, and is a diagram showing a state in the overall light scattering degree of the display area of the above screen is set to high, the projector projects an image on the above screen, and the image is displayed in the target area of the screen.

FIG. 27 is a perspective view showing a screen and a projector of a display system according to the comparative example 2, and is a diagram showing a state in the overall light scattering degree of the display area of the above screen is set to low, the projector projects an image on the above screen, and the image is displayed in the target area of a screen.

DETAILED DESCRIPTION

Figure 1:
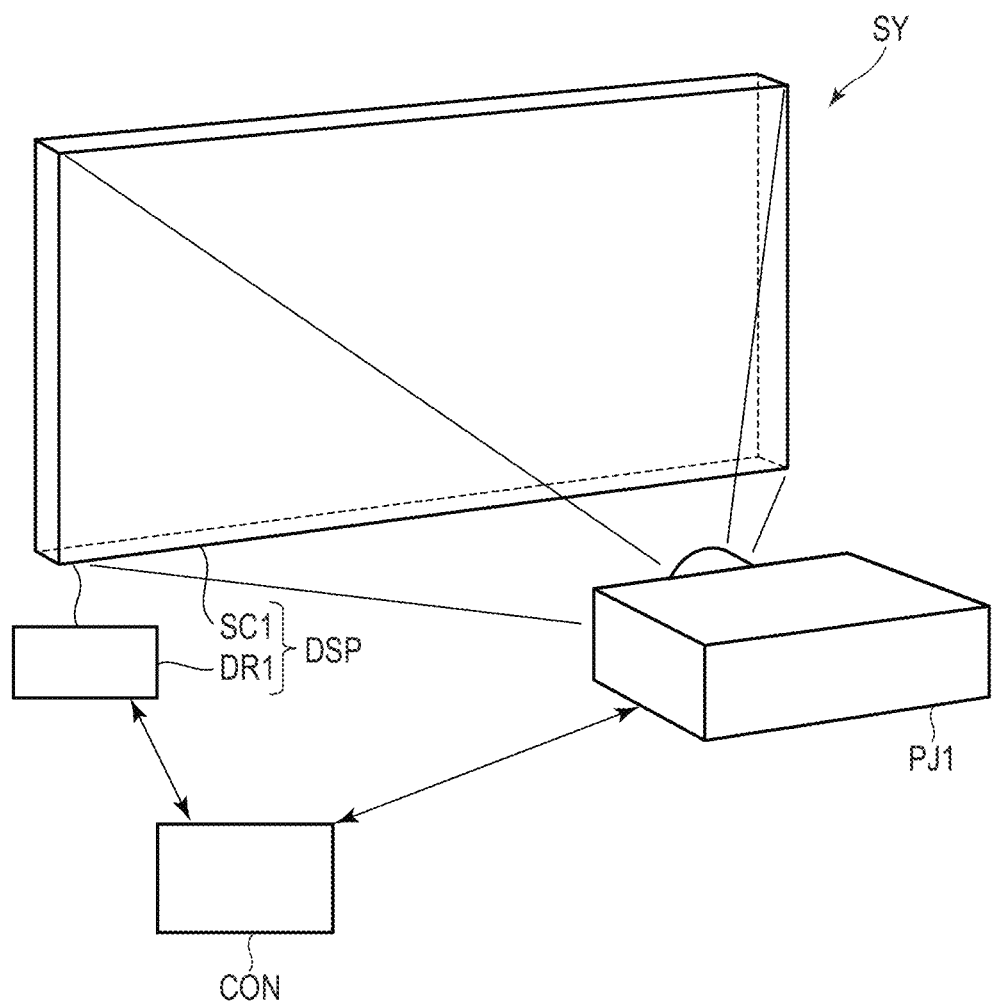
FIG. 1 is a perspective view showing a display system according to the first embodiment.

In general, according to one embodiment, there is provided a display system comprising a transparent screen that is capable of switching a light scattering degree, a projector, and a controller that controls interlocking driving of the projector and the screen, wherein the controller drives the screen and controls a light scattering degree of at least part of an area, of the screen, in which the image is projected during a period in which the projector is driven and an image is projected on the screen.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

(First Embodiment)

First, a display system SY according to the first embodiment will be described. FIG. 1 is a perspective view showing a display system SY according to the first embodiment.

As shown in FIG. 1, the display system SY includes a light scattering device DSP, a projector PJ11 which is an optical projection device, and a controller CON. The light scattering device DSP includes a transparent screen SC1 and a driver DR1. In the present embodiment, the light scattering device DSP is a liquid crystal display device to which a polymer dispersed liquid crystal is applied, and the screen SC1 is a liquid crystal display panel. The screen SC1 is configured so that the light scattering degree can be switched. The controller CON is wired or wirelessly connected to both the projector PJ1 and the screen SC1. The controller CON is provided independently of the driver DR1 and the projector PJ1. However, unlike the present embodiment, the controller CON may be provided integrally with the driver DR1 or may be provided integrally with the projector PJ1. The controller CON is configured to control interlocking driving of the projector PJ1 and the screen SC1.

Figure 2:
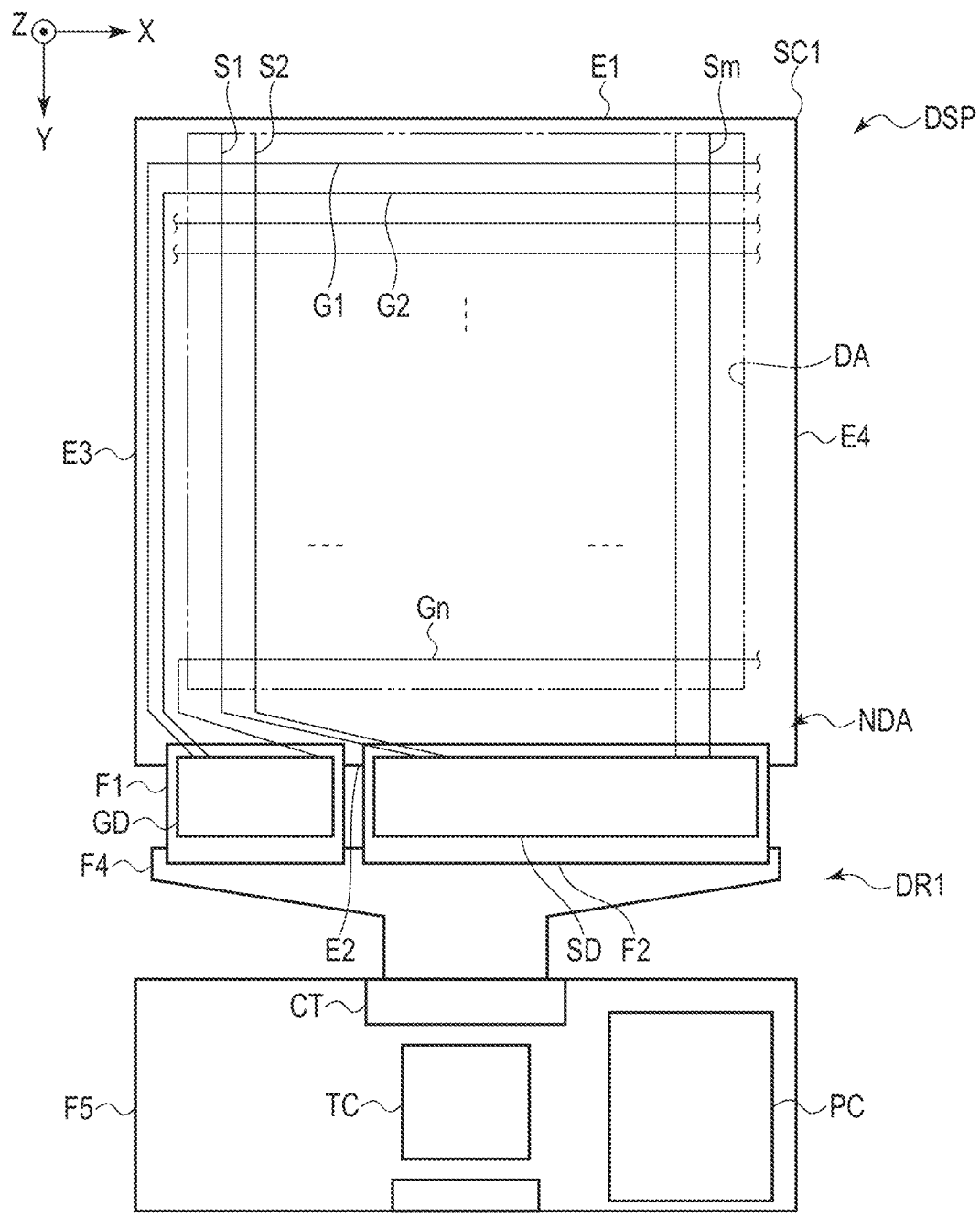
FIG. 2 is a plan view showing a configuration example of the light scattering device of the display system.

FIG. 2 is a plan view showing a configuration example of the light scattering device DSP of the display system SY.

As shown in FIG. 2, the first direction X and the second direction Y are directions that intersect each other, and the third direction Z is a direction that intersects the first direction X and the second direction Y. For example, the first direction X, the second direction Y, and the third direction Z are orthogonal to each other, but may intersect each other at an angle other than 90 degrees. The direction toward the tip of the arrow indicating the third direction Z is referred to as front (or simply up) and the direction opposite from the tip of the arrow indicating the third direction Z is referred to as rear (or simply down).

The light scattering device DSP includes the screen SC1, wiring substrates F1, F2, F4, and F5, and the like. The screen SC1 includes a display area DA in which an image is projected and the light scattering degree can be switched, and a frame shaped non-display area NDA that surrounds the display area DA. The display area DA includes n gate lines G (G1 to Gn), m source lines S (S1 to Sm), and the like. It should be noted that both n and m are positive integers, and n may be equal to m or n may be different from m. The plurality of gate lines G extends in the first direction X and are disposed spaced apart in the second direction Y. The plurality of source lines S extends in the second direction Y and are disposed spaced apart in the first direction X. The screen SC1 has edge portions E1 and E2 in the first direction X and edge portions E3 and E4 in the second direction Y.

The wiring substrate F1 includes a gate driver GD. A plurality of gate lines G is connected to the gate driver GD. The wiring substrate F2 includes a source driver SD. The plurality of source lines S is connected to the source driver SD. The wiring substrates F1 and F2 are each connected to the screen SC1 and the wiring substrate F4. The wiring substrate F5 includes a timing controller TC, a power supply circuit PC, and the like. The wiring substrate F4 is connected to a connector CT of the wiring substrate F5. It should be noted that the wiring substrates F1 and F2 may be replaced with a single wiring substrate. In addition, the wiring substrates F1, F2 and F4 may be replaced with a single wiring substrate. The gate driver GD, the source driver SD, and the timing controller TC described above constitute the driver DR1 of the present embodiment, and the driver DR1 is configured to control driving of each of the plurality of gate lines G, the plurality of source lines S, a plurality of pixel electrodes described later, and a common electrode described later.

Figure 3:
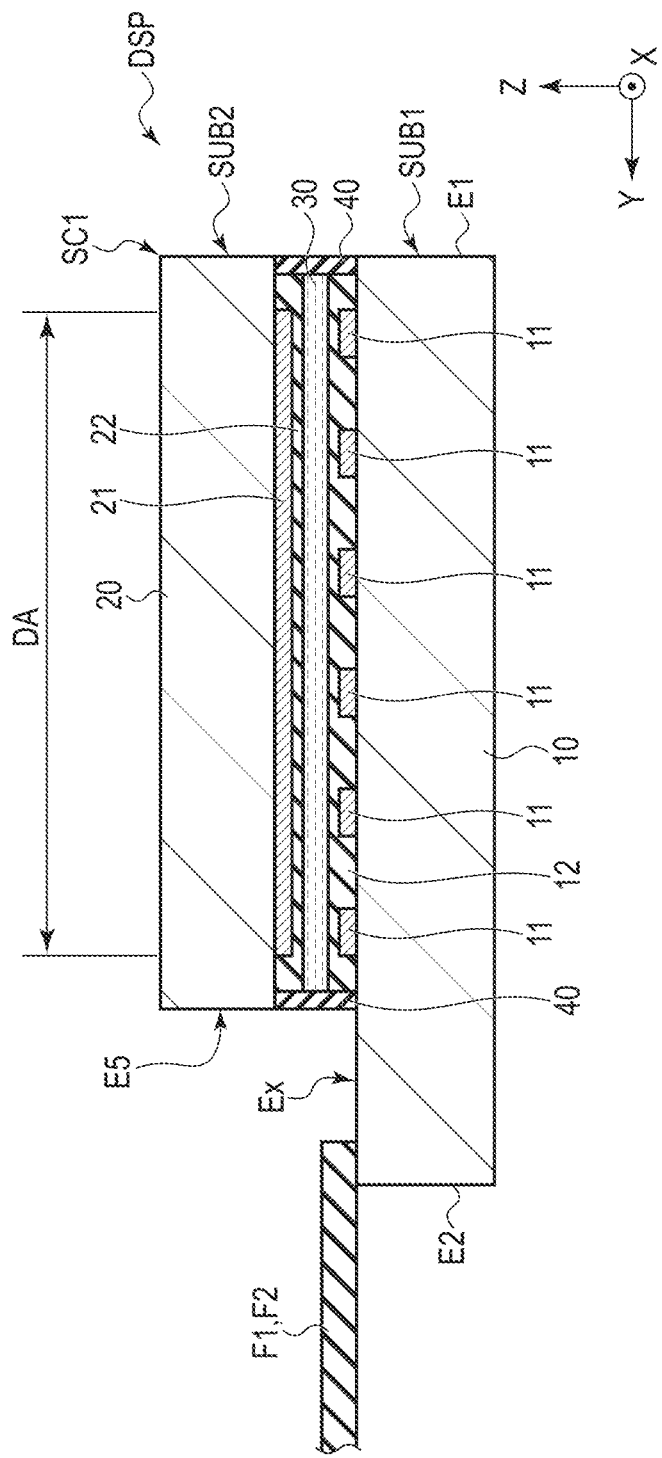
FIG. 3 is a cross-sectional view of the screen and the wiring substrate shown in FIG. 1.

FIG. 3 is a cross-sectional view of the screen SC1 and the wiring substrates F1 and F2 shown in FIG. 1. Here, only the main part will be described in the cross section of the light scattering device DSP in the Y-Z plane defined by the second direction Y and the third direction Z.

As shown in FIG. 3, a display panel PNL includes a first substrate SUB1, a second substrate SUB2, a liquid crystal layer 30 as a display function layer, and the like. The first substrate SUB1 includes a transparent substrate 10, pixel electrodes 11, an alignment film 12, and the like. The second substrate SUB2 includes a transparent substrate 20, a common electrode 21, an alignment film 22, and the like. The pixel electrodes 11 and the common electrode 21 are formed of a transparent conductive material such as indium tin oxide (ITO) or indium zinc oxide (IZO). The liquid crystal layer 30 is located at least in the display area DA.

The liquid crystal layer 30 contains a polymer-dispersed liquid crystal and is located between the alignment film 12 and the alignment film 22. The liquid crystal layer 30 of the present embodiment includes a reverse mode polymer-dispersed liquid crystal (R-PDLC). The liquid crystal layer 30 maintains the parallelism of the incident light when the applied voltage is low, and scatters the incident light when the applied voltage is high. The first substrate SUB1 and the second substrate SUB2 are adhered by a sealing material 40. The first substrate SUB1 has an extended portion EX extending in the second direction Y relative to the edge portion E5 of the transparent substrate 20.

The wiring substrates F1 and F2 are connected to the extended portion EX of the first substrate SUB1.

FIG. 4 is a diagram showing the main components of the light scattering device DSP shown in FIG. 1.

As shown in FIG. 4, the light scattering device DSP includes the driver DR1 shown by a dashed line in the figure. The driver DR1 includes the timing controller TC, the gate driver GD, the source driver SD, a Vcom circuit VC, and the like.

The timing controller TC generates various signals based on image data and synchronization signals input from the outside. For example, the timing controller TC outputs an adjustment signal generated by performing predetermined signal process based on the image data to the source driver SD. In addition, the timing controller TC outputs the control signal generated based on the synchronization signal to the gate driver GD, the source driver SD, and the Vcom circuit VC. The details of the timing controller TC will be described later.

The display area DA indicated by the chain double-dashed line in the figure includes a plurality of pixels PX. Each pixel PX includes the switching element SW and the pixel electrode 11. The switching element SW is formed of, for example, a thin-film transistor. The switching element SW is electrically connected to the gate line G and the source line S. The plurality of pixel electrodes 11 is located in the display area DA and are provided in a matrix. The pixel electrode 11 is connected to the source line S via the switching element SW. The common electrode 21 is located in the display area DA. The common electrode 21 faces the plurality of pixel electrodes 11. It should be noted that unlike the present embodiment, the common electrode 21 may be divided into at least one pixel PX, each connected to a common line, and a common common voltage may be applied.

A gate signal is supplied with each of the gate lines G from the gate driver GD. An adjustment signal is supplied with each of the source lines S from the source driver SD. A common voltage Vcom is supplied with the common electrode 21 from the Vcom circuit VC. The adjustment signal supplied to the source line S is applied to the pixel electrode 11 connected to the switching element SW during the period in which the switching element SW is conductive based on the gate signal supplied to the gate line G. In the following description, transmitting an adjustment signal to the pixel electrode 11 to form an electric potential difference between the pixel electrode 11 and the common electrode 21 may be described as writing (or applying a voltage) the adjustment signal to the pixel PX including the pixel electrode 11.

Figure 5A:
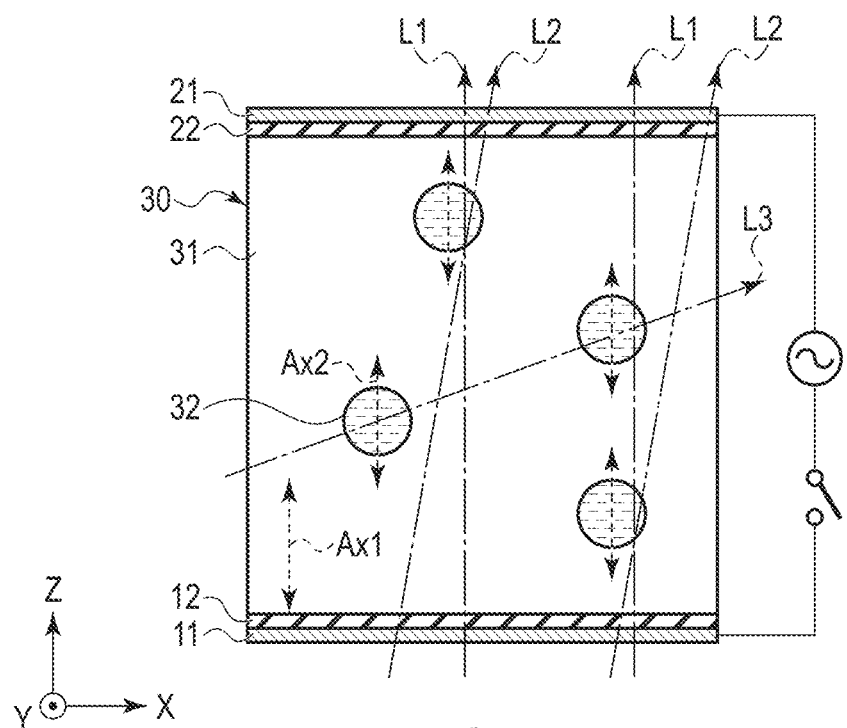
FIG. 5A is a diagram schematically showing a liquid crystal layer in a transparent state.

A configuration example of a light scattering device including a liquid crystal layer 30 which is a polymer-dispersed liquid crystal layer will be described below. FIG. 5A is a diagram schematically showing the liquid crystal layer 30 in a transparent state.

As shown in FIG. 5A, the liquid crystal layer 30 contains a liquid crystal polymer 31 and a liquid crystal molecule 32. The liquid crystal polymer 31 is obtained, for example, by polymerizing the liquid crystal monomas in a state of being oriented in a predetermined direction by the alignment restriction force of the alignment films 12 and 22. The liquid crystal molecules 32 are dispersed in the liquid crystal monomas, and when the liquid crystal monomas are polymerized, they are oriented in a predetermined direction depending on the orientation direction of the liquid crystal monomas. It should be noted that the alignment films 12 and 22 may be a horizontal alignment film that orients the liquid crystal monomas and the liquid crystal molecules 32 along the X-Y plane defined by the first direction X and the second direction Y, or may be a vertical alignment film that orients the liquid crystal monomas and the liquid crystal molecules 32 along the third direction Z.

The liquid crystal molecule 32 may be a positive type having a positive dielectric anisotropy or a negative type having a negative dielectric anisotropy. The liquid crystal polymer 31 and the liquid crystal molecule 32 each have the equal optical anisotropy.

Alternatively, the liquid crystal polymer 31 and the liquid crystal molecule 32 each have the approximately equal refractive anisotropy. In other words, each of the liquid crystal polymer 31 and the liquid crystal molecule 32 has the approximately equal ordinary refractive index and extraordinary refractive index. It should be noted that the values of the ordinary refractive index and the extraordinary refractive index of the liquid crystal polymer 31 and the liquid crystal molecule 32 do not have to be completely match, and the shift due to an error in manufacturing and the like is allowed. In addition, the response performance of each of the liquid crystal polymer 31 and the liquid crystal molecule 32 to the electric field is different. That is, the response performance of the liquid crystal polymer 31 to the electric field is lower than the response performance of the liquid crystal molecule 32 to the electric field.

The example shown in FIG. 5A corresponds to, for example, a state in which no voltage is applied to the liquid crystal layer 30 (a state in which the electric potential difference between the pixel electrode 11 and the common electrode 21 is zero), or a state in which a second transparent voltage described later is applied to the liquid crystal layer 30.

As shown in FIG. 5A, the optical axis Ax1 of the liquid crystal polymer 31 and the optical axis Ax2 of the liquid crystal molecule 32 are parallel to each other. In the example illustrated, the optical axis Ax1 and the optical axis Ax2 are both parallel to the third direction Z. The optical axis here corresponds to a line parallel to the traveling direction of light rays such that the refractive index is one value regardless of the polarization direction.

As described above, the liquid crystal polymer 31 and the liquid crystal molecule 32 have the approximately equal refractive anisotropy, and since the optical axes Ax1 and Ax2 are parallel to each other, there is almost no refractive index difference between the liquid crystal polymer 31 and the liquid crystal molecule 32 in all directions, including the first direction X, the second direction Y, and the third direction Z. For this reason, the light L1 incident on the liquid crystal layer 30 in the third direction Z is transmitted without being substantially scattered in the liquid crystal layer 30. The liquid crystal layer 30 can maintain the parallelism of the light L1. Similarly, the lights L2 and L3 incident on the oblique direction inclined with respect to the third direction Z are hardly scattered in the liquid crystal layer 30. For this reason, high transparency can be obtained. The state shown in FIG. 5A is referred to as a "transparent state".

Figure 5B:
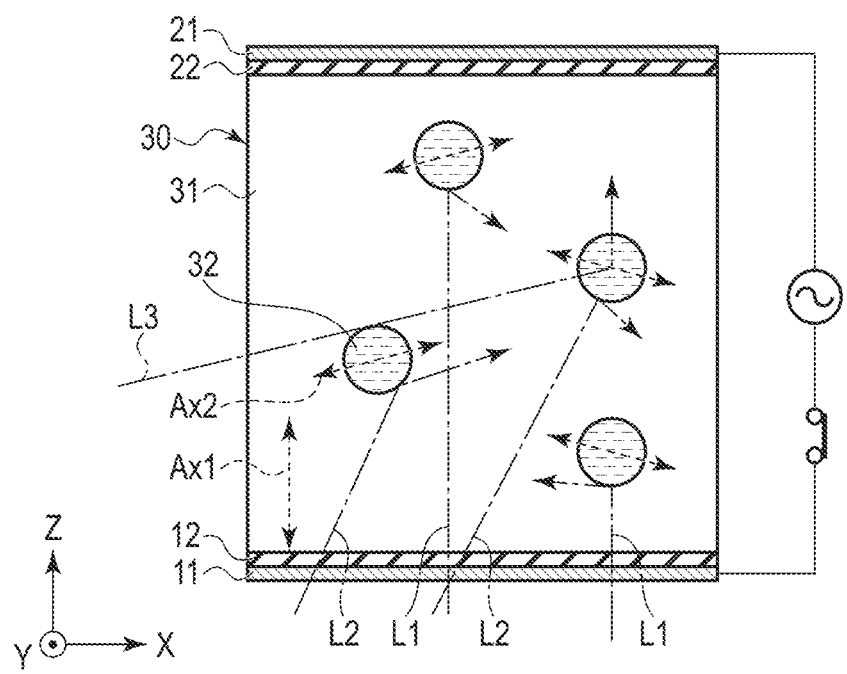
FIG. 5B is a diagram schematically showing a liquid crystal layer in a scattering state.

FIG. 5B is a diagram schematically showing the liquid crystal layer 30 in a scattering state.

As shown in FIG. 5B, as described above, the response performance of the liquid crystal polymer 31 to the electric field is lower than the response performance of the liquid crystal molecule 32 to the electric field. For this reason, while the orientation direction of the liquid crystal polymer 31 hardly changes in a state where a voltage (scatter voltage described later) higher than each of the second transparent voltage and the later-described first transparent voltage is applied to the liquid crystal layer 30, the orientation direction of the liquid crystal molecule 32 changes according to the electric field. In other words, as illustrated in the drawing, the optical axis Ax1 is almost parallel to the third direction Z, while the optical axis Ax2 is inclined with respect to the third direction Z. For this reason, the optical axes Ax1 and Ax2 intersect each other. Therefore, there is a large refractive index difference between the liquid crystal polymer 31 and the liquid crystal molecule 32 in all directions including the first direction X, the second direction Y, and the third direction Z. As a result, the light L1 to L3 incident on the liquid crystal layer 30 is scattered in the liquid crystal layer 30. The state shown in FIG. 5B is referred to as a "scattering state".

The controller switches the liquid crystal layer 30 to at least one of a transparent state and a scattering state.

Figure 6A:
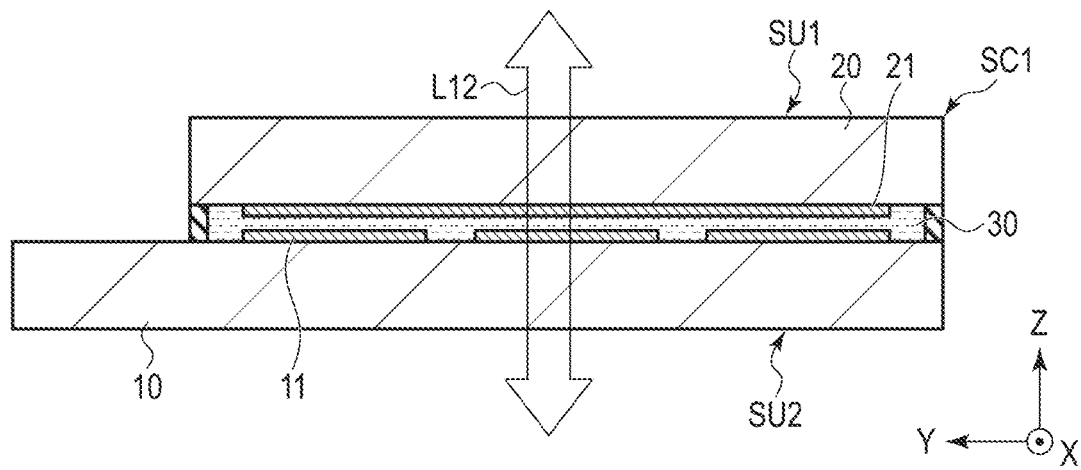
FIG. 6A is a cross-sectional view showing a screen when the liquid crystal layer is in a transparent state.

FIG. 6A is a cross-sectional view showing the screen SC1 when the liquid crystal layer 30 is in a transparent state. As shown in FIG. 6A, the external light L12 incident on the screen SC1 is transmitted with almost no scattered by the liquid crystal layer 30. An example of the external light L12 includes light emitted by the projector PJ1 when the projector PJ1 projects an image on the screen SC1. Here, in the screen SC1, the face, of the transparent substrate 20, opposite to the face facing the transparent substrate 10 is designated as a first projection plane SU1, and the face, of the transparent substrate 10, opposite to the face facing the transparent substrate 20 is designated as a second projection plane SU2.

For example, the external light L12 incident on the liquid crystal layer 30 from the first projection plane SU1 side is transmitted to the second projection plane SU2, and the external light L12 incident on the liquid crystal layer 30 from the second projection plane SU2 side is transmitted to the first projection plane SU1. For this reason, when the screen SC1 is observed from the first projection plane SU1 side, the user can visually recognize the background on the second projection plane SU2 side through the screen SC1. Similarly, when the screen SC1 is observed from the second projection plane SU2 side, the background on the first projection plane SU1 side can be visually recognized through the screen SC1.

Figure 6B:
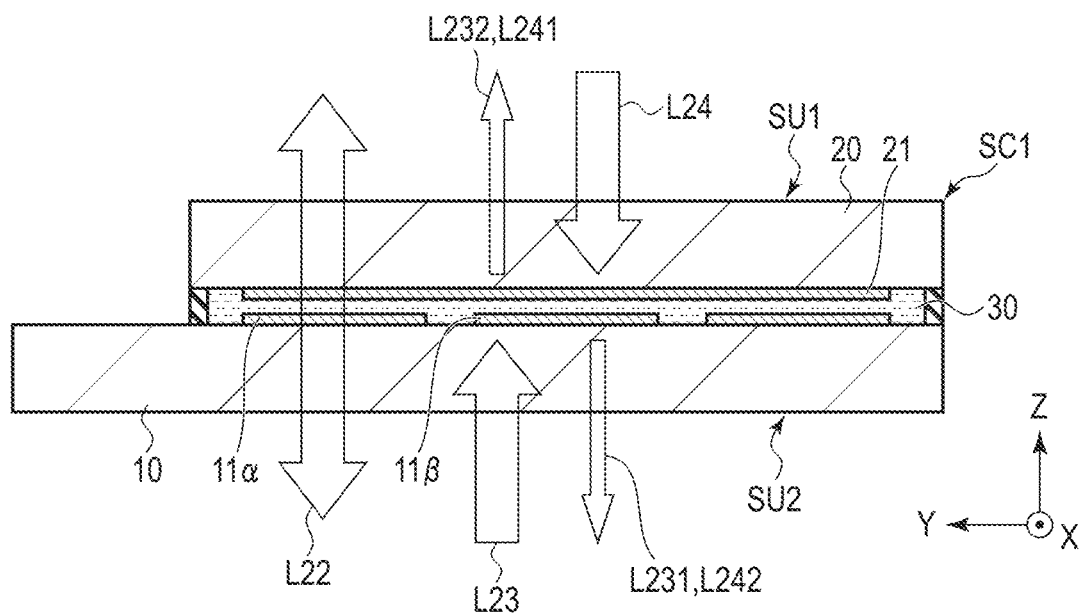
FIG. 6B is a cross-sectional view showing a screen when the liquid crystal layer is in a scattering state.

FIG. 6B is a cross-sectional view showing the screen SC1 when the liquid crystal layer 30 is in a scattering state. As shown in FIG. 6B, in the example illustrated, the liquid crystal layer 30 between the pixel electrode 11α and the common electrode 21 (the liquid crystal layer to which the voltage applied between the pixel electrode 11α and the common electrode 21 is applied) is in a transparent state. For this reason, at the position where it overlaps with a pixel electrode 11α, the external light L22 incident on the screen SC1 is transmitted with almost no scattered by the liquid crystal layer 30, similarly to the external light L12 shown in FIG. 6A.

On the other hand, the liquid crystal layer 30 between a pixel electrode 11β and the common electrode 21 (the liquid crystal layer to which the voltage applied between the pixel electrode 11β and the common electrode 21 is applied) is in a scattering state.

For this reason, when the external light L24 is incident on the liquid crystal layer 30 from the first projection plane SU1 side at the position where it overlaps with the pixel electrode 11β, the external light L24 is scattered by the liquid crystal layer 30, light L241 that is part of the external light L24 is emitted from the first projection plane SU1, and the light L242 that is another part of the external light L24 is emitted (transmitted) from the second projection plane SU2. In this case, the amount of the light L241 is larger than the amount of the light L242. From the above, when the light emitted by the projector PJ1 is the external light L24, it is easier for the user to visually recognize the image projected on the screen SC1 when observing the screen SC1 from the first projection plane SU1 side than when observing the screen SC1 from the second projection plane SU2 side.

Or, when the external light L23 is incident on the liquid crystal layer 30 from the second projection plane SU2 side at the position where it overlaps with the pixel electrode 11β, the external light L23 is scattered by the liquid crystal layer 30, the light L231 that is part of the external light L23 is emitted from the second projection plane SU2, and the light L232 that is another part of the external light L23 is emitted (transmitted) from the first projection plane SU1. In this case, the amount of the light L231 is larger than the amount of the light L232. From the above, when the light emitted by the projector PJ1 is the external light L23, it is easier for the user to visually recognize the image projected on the screen SC1 when observing the screen SC1 from the second projection plane SU2 side than when observing the screen SC1 from the first projection plane SU1 side.

From the above, the light emitted by the projector PJ1 is the external light L24, when observing the screen SC1 from the first projection plane SU1 side, not only the light L241 is incident on the user, but also the light related to the background on the second projection plane SU2 side can also be incident as light L232 on the user. For this reason, when the light scattering degree of the liquid crystal layer 30 is low, the user may be able to visually recognize both the image projected by the projector PJ1 on the screen SC1 and the background on the second projection plane SU2 side.

In addition, when the light emitted by the projector PJ1 is the external light L24 and the screen SC1 is observed from the second projection plane SU2 side, the light L242 and the light L231 are incident on the user. The light L242 includes a light component emitted by the projector PJ1 and a light component related to the background on the first projection plane SU1 side. For this reason, depending on the ratio between the amount of a light component emitted by the projector PJ1 and the amount of a light component related to the background on the first projection plane SU1 side, and the light scattering degree of the liquid crystal layer 30, the user may visually recognize the image projected by the projector PJ1 on the screen SC1 and visually recognize the background on the first projection plane SU1 side.

It should be noted that since the liquid crystal layer 30 is in a transparent state at the position where it overlaps with the pixel electrode 11α, the background can be visually recognized through the screen SC1.

From the above, the controller CON drives the common electrode 21, individually drives a plurality of pixel electrodes 11, applies a voltage applied between the common electrode 21 and the plurality of pixel electrodes 11 to the liquid crystal layer 30, and is configured to switch the liquid crystal layer 30 between a transparent state and a scattering state.

Figure 7:
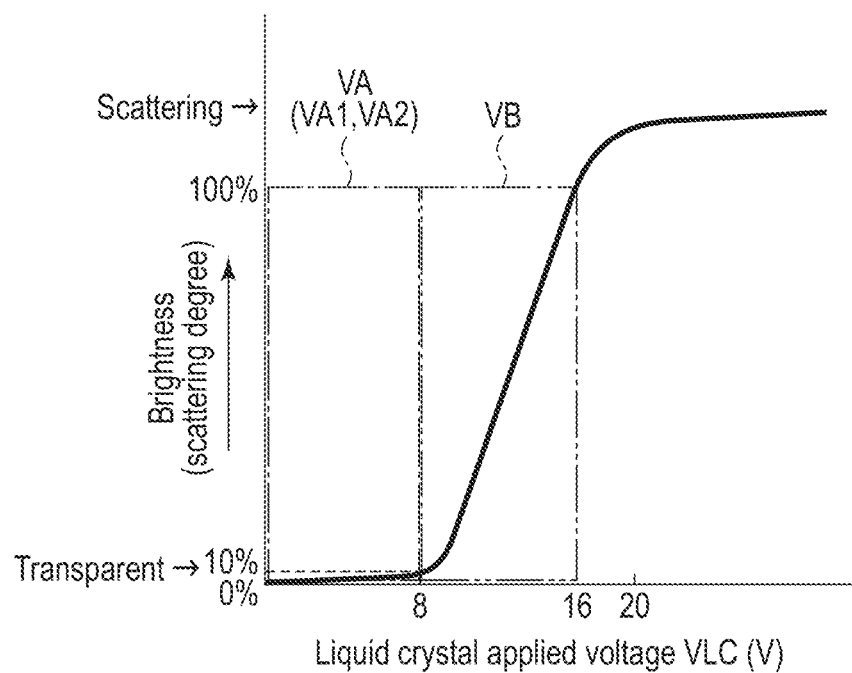
FIG. 7 is a graph showing the scattering characteristics of the liquid crystal layer.

FIG. 7 is a graph showing the scattering characteristics of the liquid crystal layer 30, and shows the relationship between the voltage VLC applied to the liquid crystal layer 30 and the brightness. The brightness here corresponds to, for example, the brightness of the light L241 obtained when the external light L24 is scattered by the liquid crystal layer 30 as shown in FIG. 6B. From another point of view, this brightness represents the light scattering degree of the liquid crystal layer 30. However, the relationship between the voltage VLC and the brightness is not limited to the example shown in FIG. 7.

As shown in FIG. 7, when the voltage VLC is increased from 0 V, the brightness increases sharply from about 8 V and saturates at about 20 V. It should be noted that even when the voltage VLC is between 0 V and 8 V, the brightness increases slightly. In the present embodiment, the area surrounded by the chain double-dashed line, that is, the voltage of 8 V<VLC 16 V is referred to as a "scatter voltage". In addition, in the present embodiment, the area surrounded by the alternate long and short dash line, that is, the voltage of 0 V≤VLC≤8 V is referred to as a "transparent voltage". The transparent voltage VA includes a first transparent voltage VA1 and a second transparent voltage VA2. It should be noted that the lower limit value and the upper limit value of the scatter voltage VB and the transparent voltage VA are not limited to this example, and can be appropriately determined according to the scattering characteristics of the liquid crystal layer 30.

Here, the light scattering degree is 100% when the scattering degree of the light incident on the liquid crystal layer 30 is the highest when the scatter voltage VB is applied to the liquid crystal layer 30. Here, the light scattering degree when the scatter voltage VB of 16 V is applied to the liquid crystal layer 30 is set to 100%. For example, the transparent voltage VA can be defined as the range of voltage VLC where the light scattering degree (brightness) is less than 10%. Alternatively, the transparent voltage VA can be defined as a voltage VLC having a voltage (8 V in the example of FIG. 7) or less corresponding to the lowest gradation.

In addition, the transparent voltage VA (first transparent voltage VA1 and second transparent voltage VA2) may be different from the example shown in FIG. 7. For example, the first transparent voltage VA1 may be a voltage in which the light scattering degree is in the range of 10% or more and 50% or less. In addition, the second transparent voltage VA2 may be a voltage in which the light scattering degree is in the range of less than 10%.

It should be noted that the graph shown in FIG. 7 can be applied to the case where the polarity of the voltage applied to the liquid crystal layer 30 is positive (+) and negative (−). In the latter case, the voltage VLC is the absolute value of the negative voltage. A polarity inversion drive that inverts the polarity of the voltage applied to the liquid crystal layer 30 can be applied to the light scattering device DSP.

Figure 8:
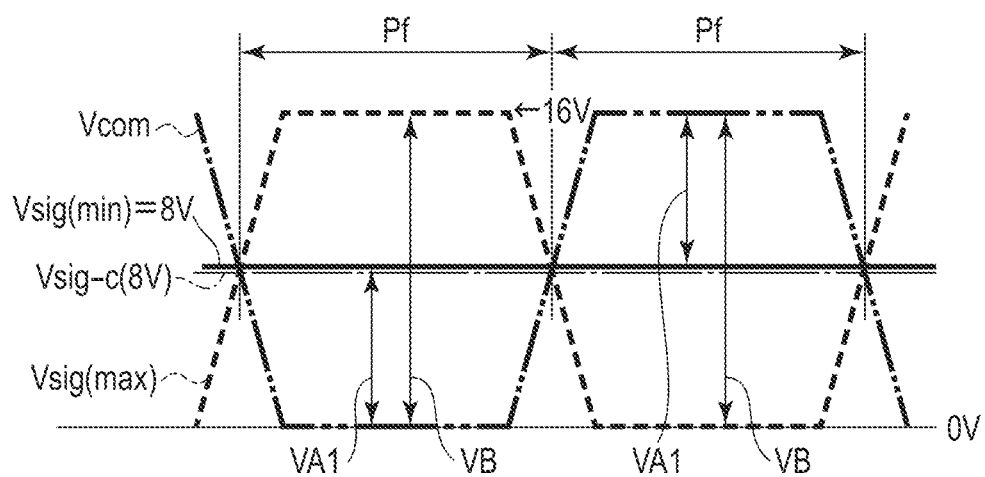
FIG. 8 is a diagram showing an example of the common voltage and the adjustment signal in the scattering drive.

FIG. 8 is a diagram showing an example of a common voltage Vcom supplied with the common electrode 21 and an adjustment signal Vsig supplied to the source line S (or the pixel electrode 11) in the drive in which the polarity inversion drive is applied.

As shown in FIG. 8, for the adjustment signal Vsig, the waveform corresponding to when the voltage VLC applied to the liquid crystal layer 30 is 16 V (max), and the waveform corresponding to when the voltage VLC is 8 V (min), are shown. Here, the waveform of the adjustment signal Vsig (min) is represented by the solid line, the waveform of the common voltage Vcom is represented by the chain double-dashed line, and the waveform of the adjustment signal Vsig (max) is represented by the dashed line. In the example of this figure, the common voltage Vcom and the adjustment signal Vsig (see the waveform of the maximum value) are polarity inverted every one frame period Pf. The reference voltage Vsig-c is, for example, 8 V. For the common voltage Vcom and the adjustment signal Vsig, the lower limit value is 0 V and the upper limit value is 16 V.

Focusing on the polarity inversion drive of not only the example shown in FIG. 8 but also the example of FIG. 9 described later, when the drive voltage applied to the liquid crystal layer 30 (voltage written to the pixel PX) is positive, the difference (Vsig−Vcom) between the adjustment signal Vsig and the common voltage Vcom is 0 V or a positive voltage value. On the other hand, when the drive voltage (voltage written to the pixel PX) applied to the liquid crystal layer 30 is negative, the difference (Vsig−Vcom) between the adjustment signal Vsig and the common voltage Vcom is 0 V or a negative voltage value.

Focusing on the polarity inversion drive shown in FIG. 8, the common voltage Vcom is 0 V, and the adjustment signal Vsig is a voltage value corresponding to the light scattering degree indicated by the adjustment signal in the range of 8 V or more and 16 V or less during the period in which the positive voltage is written to the pixel PX. On the other hand, the common voltage Vcom is 16 V, and the adjustment signal Vsig is a voltage value corresponding to the light scattering degree indicated by the adjustment signal in the range of 0 V or more and 8 V or less during the period in which the negative voltage is written to the pixel PX. That is, in any case, a voltage of 8 V or more and 16 V or less is applied between the common electrode 21 and the pixel electrode 11.

As shown in FIG. 7, even when the voltage VLC applied to the liquid crystal layer 30 is 8 V, in other words, even when the first transparent voltage VA1 is applied to the liquid crystal layer 30, the liquid crystal layer 30 has a light scattering degree of about 0 to 10%. Therefore, even when the adjustment signal Vsig is set to the minimum gradation value, the external light incident on the screen SC1 may be slightly scattered and the visibility of the background of the screen SC1 may be deteriorated.

For this reason, the visibility of the background of the screen SC1 can be improved by applying at any time a transparent drive that makes the voltage between the pixel electrode 11 and the common electrode 21 smaller than, for example, 8 V.

Here, the relationship between the output of the source driver SD and the common voltage Vcom will be described.

When the withstand voltage of the source driver SD is low, the common voltage Vcom is inverted and driven in order to increase the liquid crystal applied voltage. At this time, the source driver SD can output simultaneously only one of the positive adjustment signal Vsig (for example, reference voltage Vsig-c to 16 V) and the negative adjustment signal Vsig (for example, 0 V to reference voltage Vsig-c). In addition, the polarity of the common voltage Vcom is opposite to a polarity of the output of the source driver SD.

However, when the source driver SD having a high withstand voltage is used, the relationship between the adjustment signal Vsig and the common voltage Vcom may be the above-mentioned relationship or the following relationship. That is, the common voltage Vcom is fixed at 0 V, and the adjustment signal Vsig output by the source driver SD is 0 to +16 V at the positive polarity and −16 to 0 V at the negative polarity.

Figure 9:
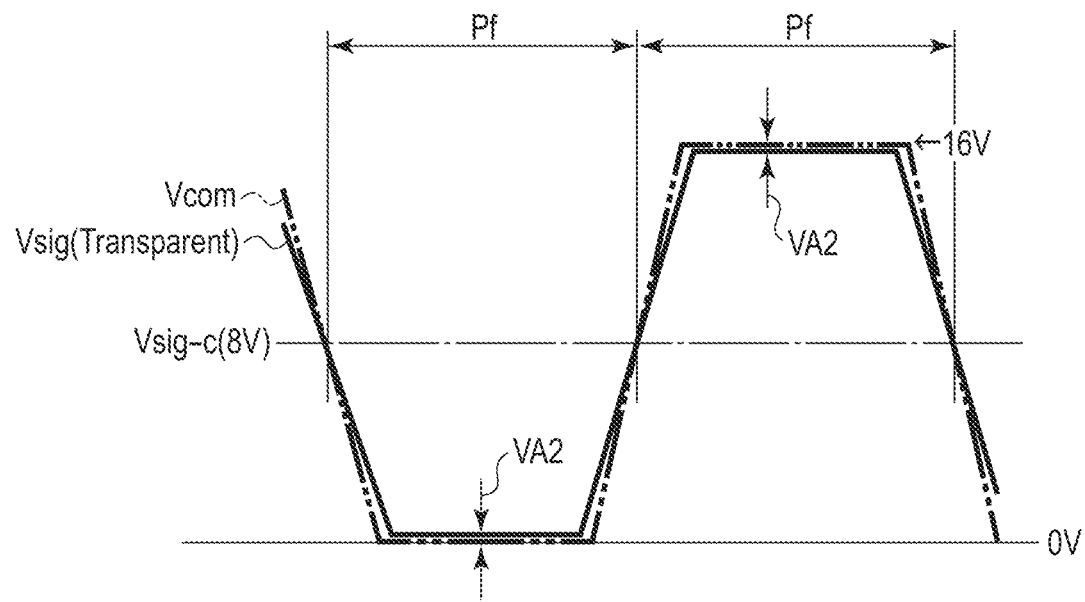
FIG. 9 is a diagram showing an example of the common voltage and the adjustment signal in the transparent drive.

FIG. 9 is a diagram showing an example of the common voltage Vcom and the adjustment signal Vsig in the transparent drive. Here, the waveform of the adjustment signal Vsig is represented by the solid line, and the waveform of the common voltage Vcom is represented by the chain double-dashed line.

As shown in FIG. 9, as in the example of FIG. 8, the common voltage Vcom is alternately switched between 0 V and 16 V every one frame period Pf. In the transparent drive, the voltage value of the adjustment signal Vsig matches the common voltage Vcom (Vsig=Vcom=0 V or Vsig=Vcom=16 V) for each frame period Pf. It should be noted that in FIG. 9, the adjustment signal Vsig and the common voltage Vcom are shown with a slight shift due to the illustration. For this reason, 0 V is applied to the liquid crystal layer 30. In other words, the second transparent voltage VA2 is applied to the liquid crystal layer 30.

However, the source line voltage Vsig in the transparent drive is not limited to the example shown in FIG. 9. For example, during the period in which the common voltage Vcom is 0 V, the source line voltage Vsig may be greater than 0 V and be less than 8 V (0 V<Vsig<8 V). During the period in which the common voltage Vcom is 16 V, the source line voltage Vsig may be greater than 8 V and less than 16 V (8 V<Vsig<16 V). In either case, according to the transparent drive, the absolute value of the difference between the source line voltage Vsig and the common voltage Vcom is less than 8 V, and the parallelism of the light transmitted through the liquid crystal layer 30 increases. In other words, the second transparent voltage VA2 is not limited to 0 V, and the absolute value of the second transparent voltage VA2 may be less than 8 V.

It should be noted that in the transparent drive, the voltage applied to the liquid crystal layer 30 may be less than, for example, 8 V and the adjustment signal Vsig does not have to completely match the common voltage Vcom. As described above, the scattering degree when the scattering degree of the light incident on the liquid crystal layer 30 when the scatter voltage VB is applied to the liquid crystal layer 30 is the highest is set to 100%. For example, the second transparent voltage VA2 is preferably a voltage having a scattering degree of less than 10%.

Figure 10:
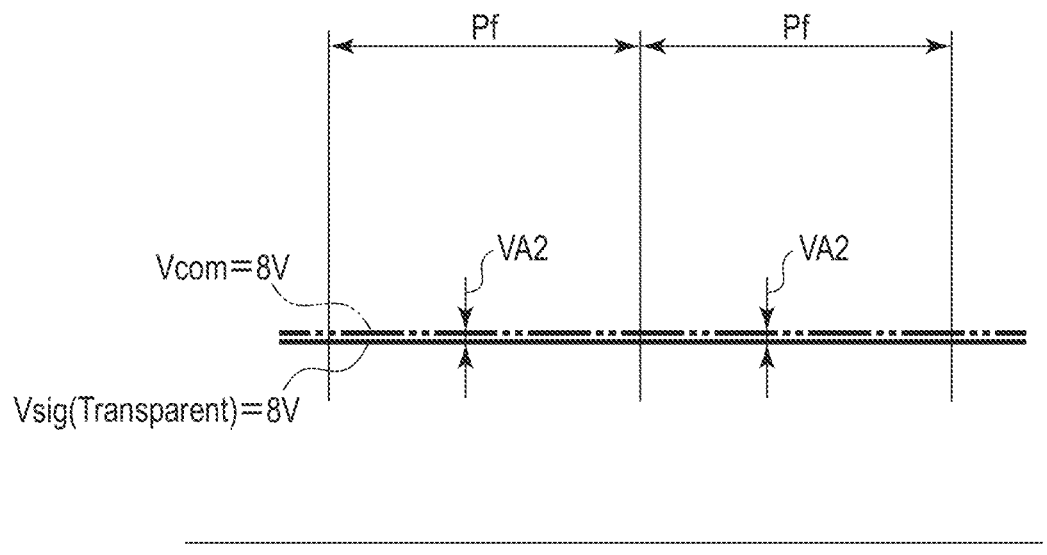
FIG. 10 is a diagram showing another example of the common voltage and the adjustment signal in the transparent drive.

FIG. 10 is a diagram showing another example of the common voltage Vcom and the adjustment signal Vsig in the transparent drive. Here, the waveform of the adjustment signal Vsig is represented by the solid line, and the waveform of the common voltage Vcom is represented by the chain double-dashed line.

As shown in FIG. 10, in this example, the polarity inversion of the common voltage Vcom and the adjustment signal Vsig is stopped in the transparent drive. Furthermore, the common voltage Vcom and the adjustment signal Vsig match at 8 V (reference voltage Vsig-c described above). It should be noted that the common voltage Vcom and the adjustment signal Vsig may match at a voltage other than the reference voltage Vsig-c, such as 0 V. In addition, as in the case shown in FIG. 9, it is desirable that the second transparent voltage VA2 is a voltage having a scattering degree of less than 10%.

Figure 11:
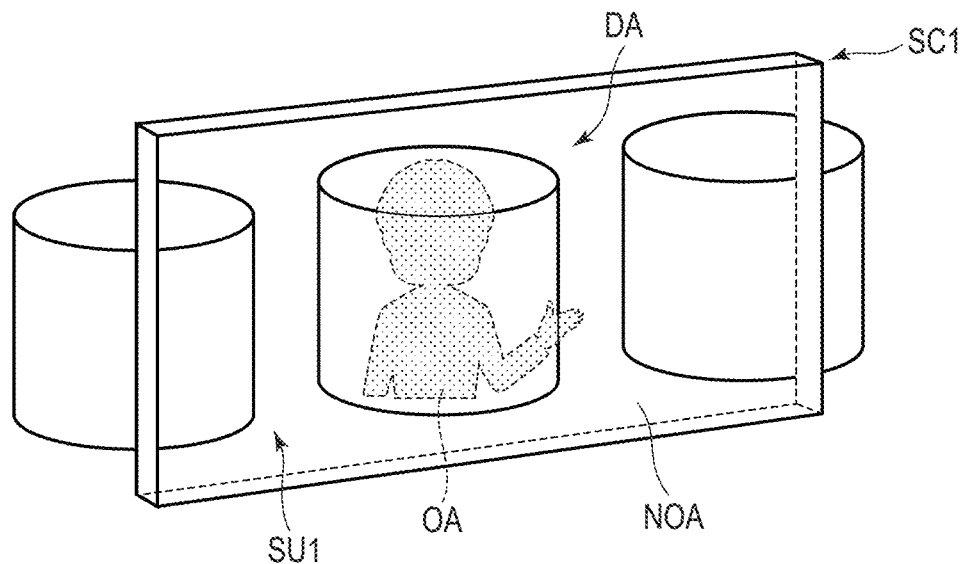
FIG. 11 is a perspective view showing the screen, and is a diagram showing a state in which the target area of the screen is switched to the scattering state, the non-target area of the screen is set in a transparent state, and the background is visible through the non-target area of the screen.

Next, the screen SC1 whose driving is controlled by the controller CON will be described. FIG. 11 is a perspective view showing the screen SC1, and is a diagram showing a state in a target area OA of screen SC1 is switched to a scattering state, a non-target area NOA of screen SC1 is set in a transparent state, and the background can be visually recognized through the non-target area NOA of the screen SC1.

As shown in FIG. 11, the controller CON can control driving of the driver DR1 and control the light scattering degree of the display area DA of the screen SC1. The controller CON is configured to drive the screen SC1 and control the light scattering degree of at least part of the area, of the screen SC1, in which an image is projected.

In FIG. 11, the projector PJ1 shows the state where the image is not projected on the screen SC1, the controller CON can switch the target area OA, in the display area DA of the screen SC1, in which the image is projected to the scattering state, and can set the non-target area NOA other than the target area OA in the transparent state. For this reason, in the target area OA, the background of the screen SC1 can be made difficult to visually recognize, and for example, it is possible to make it difficult for the user to visually recognize a portion hidden in the target area OA of the three cylinders located behind the screen SC1. On the other hand, in the non-target area NOA, the background of the screen SC1 can be made easier to visually recognize, and for example, it is possible to make it easy for the user to visually recognize a portion that is not hidden in the target area OA of the three cylinders located behind the screen SC1.

Figure 12:
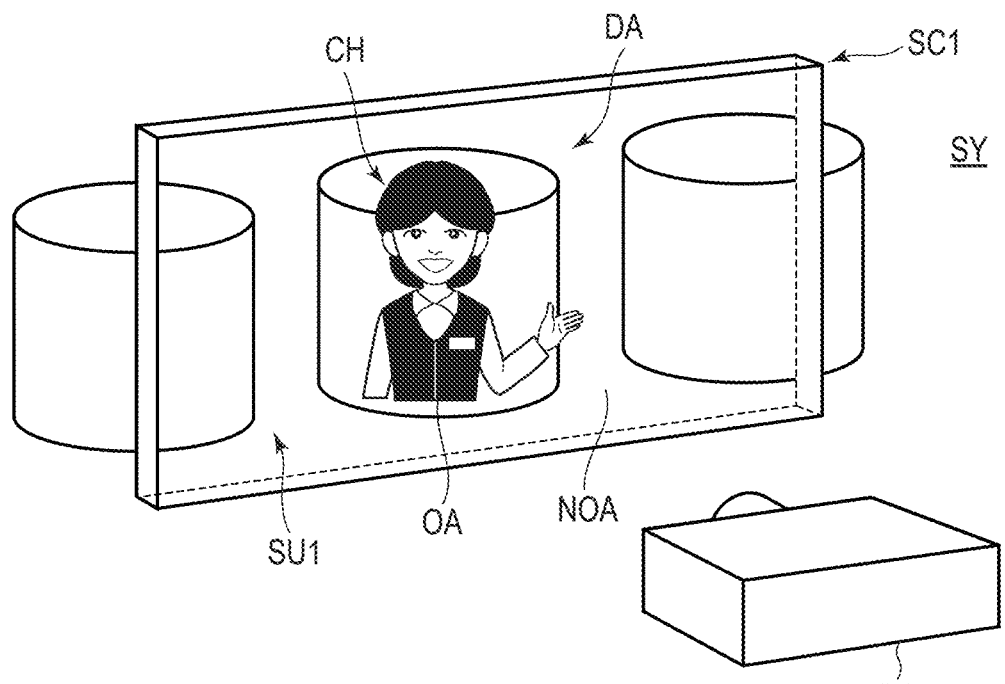
FIG. 12 is a perspective view showing the screen and the projector of the display system, and is a diagram showing a state in which the projector projects an image on the screen shown in FIG. 11 and displays the image in a target area of the screen.

Next, the screen SC1 in which the light scattering degree is controlled and an image is projected from the projector will be described. FIG. 12 is a perspective view showing the screen SC1 and the projector PJ1 of the display system SY, and is a diagram showing a state in the projector PJ1 projects an image on the screen SC1 shown in FIG. 11, and displays the image in the target area OA of the screen SC1.

As shown in FIG. 12, the projector PJ1 can have image data and project an image on the screen SC1 based on the image data. The above image data also includes the driver DR1 of the light scattering device DSP. For this reason, the controller CON can control driving of the driver DR1 and control the light scattering degree of the display area DA of the screen SC1 based on the image data. In addition, as described above, the controller CON can control the interlocking drive of the projector PJ1 and the screen SC1.

For this reason, the controller CON can drive the screen SC1 and control the light scattering degree of at least part of the area, of the screen SC1, in which an image CH is projected during a period in which the projector PJ1 is driven and the image CH is projected on the screen SC1. In the example illustrated in FIG. 12, the controller CON drives the projector PJ1 to project the image CH onto the target area OA of the screen SC1. The controller CON switches the target area OA, of the screen SC1, in which the image CH is projected to the scattering state, controls the light scattering degree of the target area OA, and sets the non-target area NOA in a transparent state during the period in which the image CH is projected onto the target area OA.

The controller CON is configured to adjust the position, the size, and the shape of the target area OA in association with the image on the screen SC1 during the period. For example, the controller CON can perform adjustment so that the target area OA is identical to the image CH on the screen SC1 in position, size, and shape during the period. In the example of FIG. 12, the target area OA and the image CH on the screen SC1 are identical in position, size, and shape.

Alternatively, the controller CON may perform adjustment so that the shape of the target area OA is similar to the shape of the image CH on the screen SC1 during the period.

At this time, the size of the target area OA can be adjusted so as to be larger than the size of the image CH on the screen SC1 or smaller than the size of the image CH on the screen SC1.

In addition, when controlling the light scattering degree of the target area OA, the controller CON can set the entire target area OA to the identical light scattering degree, or set the target area OA to the different light scattering degree for each area. It should be noted that the higher the light scattering degree of the target area OA, the higher the brightness level of the image CH projected on the screen SC1. For this reason, when setting different light scattering degrees for each area of the target area OA, it is possible to increase the light scattering degree in the area where the brightness level of the image CH is desired to be high, and to decrease the light scattering degree in the area where the brightness level of the image CH is desired to be low. The light scattering degree can be controlled for each pixel PX of the screen SC1.

In addition to the above, when the position, the size, or the shape of the image projected by the projector PJ1 changes over time, for example, when the projector PJ1 projects a moving image on the screen SC1, the controller CON may change the position, the size, or the shape of the target area OA by following the image projected on the screen SC1. As mentioned above, since the projector PJ1 and the driver DR1 can have the identical image data (moving image data), and the controller CON can drive the projector PJ1 and the screen SC1 in conjunction with each other, the projection of the moving image by the projector PJ1 can be made to follow the drive of the screen SC1.

According to the display system SY of the first embodiment configured as described above, the screen SC1 can be disposed outdoors when using the display system SY. The screen SC1 is configured by an active-matrix liquid crystal display panel, and the liquid crystal layer 30 includes the R-PDLC. The controller CON selectively switches the target area OA to the scattering state and sets the non-target area NOA in a transparent state. The controller CON controls the light scattering degree of the target area OA in conjunction with the high and low brightness levels of the image CH projected on the screen SC1.

The user can easily visually recognize the image CH. Alternatively, the user is less likely to be affected by the background when visually recognizing the image CH. As a result, it is possible to obtain a display device DSP capable of improving the visibility of the background and the display quality. For this reason, it is possible to clearly separate the transparent area (non-target area NOA) and the area in which the image CH is projected (target area OA), compared to when using a screen in which the light scattering material is uniformly embedded throughout the display area DA. When the background is viewed through the screen SC1, it is difficult to blur the background in the non-target area NOA set in a transparent state, so that the deterioration of the visibility of the background in the non-target area NOA can be suppressed. From the above, the display system SY can display the image CH that is not affected by external light.

(Second Embodiment)

Figure 13:
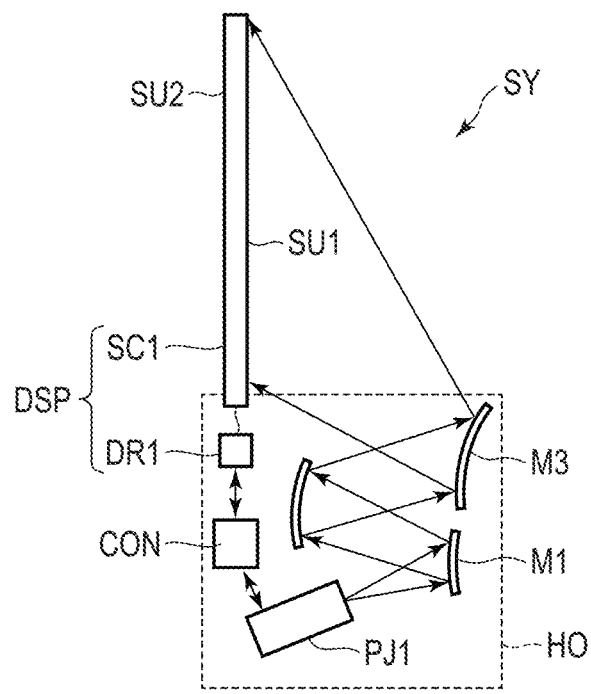
FIG. 13 is a cross-sectional view showing a display system according to the second embodiment.

Next, a display system SY according to the second embodiment will be described. FIG. 13 is a cross-sectional view showing the display system SY according to the second embodiment.

As shown in FIG. 13, the display system SY of the present embodiment further includes a housing HO, a first reflecting mirror M1, a second reflecting mirror M2, and a third reflecting mirror M3, which are optical systems. The screen SC1, the driver DR1, the projector PJ1, the first to third reflecting mirrors M1 to M3, and the controller CON are incorporated in the housing HO. By using the first to third reflecting mirrors M1 to M3, the distance from the projector PJ1 to the screen SC1 can be shortened as compared with the distance in the first embodiment described above, and the short distance projection type display system SY can be configured. For this reason, the display system SY of the present embodiment can reduce the overall size as compared with the display system SY of the first embodiment described above.

In addition, the screen SC1, the projector PJ1, and the first to third reflecting mirrors M1 to M3 are physically fixed to the housing HO. For this reason, the positional shift between the target area OA of the screen SC1 and the image projected by the projector PJ1 on the screen SC1 can be made extremely small.

In addition, by integrating the display system SY as in the present embodiment, it will be possible to introduce the large scale display system SY even at a location where the space is restricted, such as outdoor public spaces, or in a limited space in the home.

The second embodiment described above can have the same effect as the first embodiment.

(Third Embodiment)

Next, a display system SY according to the third embodiment will be described. In the second embodiment, when the projector PJ1 projects an image on the screen SC1, the light is incident on the liquid crystal layer 30 only from the first projection plane SU1 side. For this reason, as described with reference to FIG. 6B, a user who visually recognizes the screen SC1 from the first projection plane SU1 side can easily visually recognize the image CH projected on the screen SC1 (FIG. 12).

Figure 14:
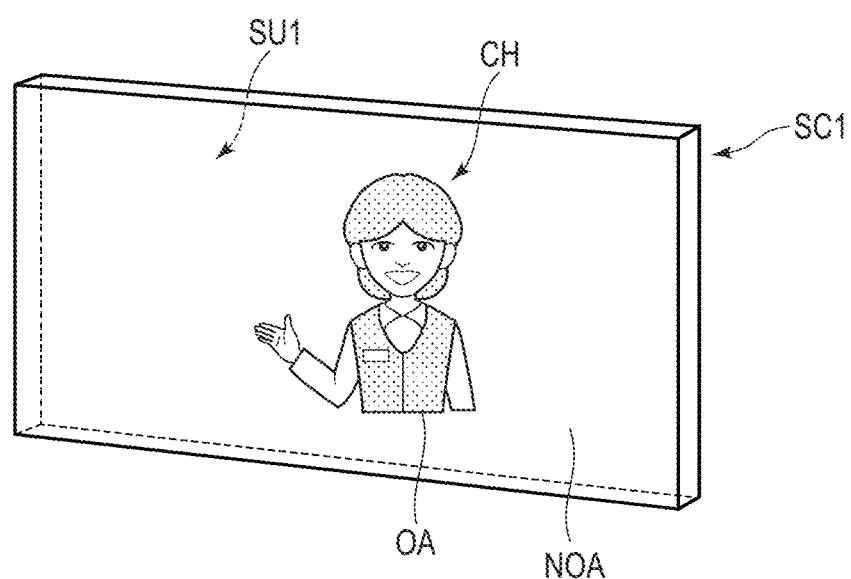
FIG. 14 is a perspective view showing a screen of the display system according to the second embodiment, and is a view of a screen viewed from an opposite side of the first projection plane.

However, it is difficult for a user who visually recognizes the screen SC1 from an opposite side of the first projection plane SU1 to visually recognize the image CH projected on the screen SC1 (FIG. 14). This is because the brightness level of the image CH is lower when the image CH is viewed from opposite side of the first projection plane SU1 of the screen SC1 than when the image CH is viewed from the first projection plane SU1 side. The image CH displayed on the first projection plane SU1 side tends to have higher color reproducibility.

Figure 15:
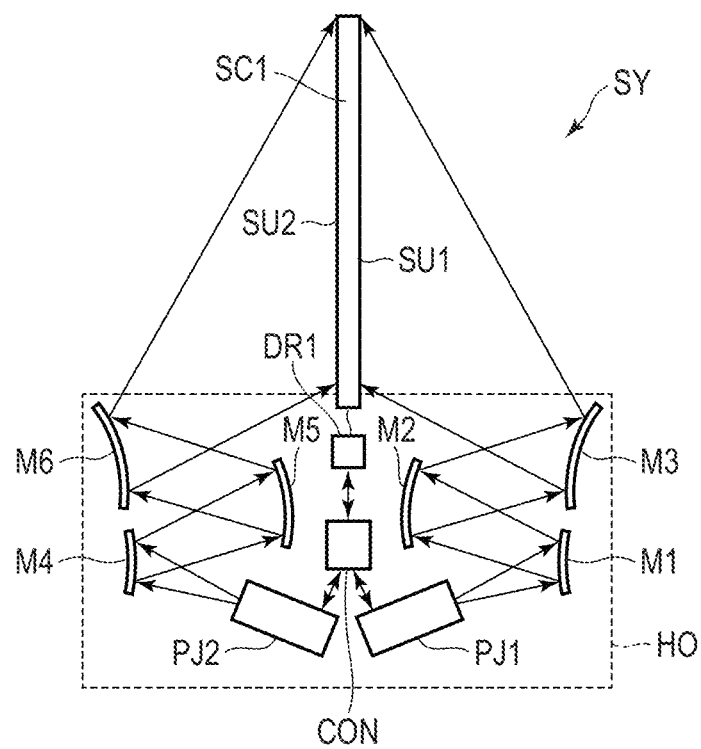
FIG. 15 is a cross-sectional view showing a display system according to the third embodiment.

Therefore, the display system SY of the present embodiment projects an image from both sides of the screen SC1. FIG. 15 is a cross-sectional view showing the display system SY according to the third embodiment.

As shown in FIG. 15, the present embodiment differs from the second embodiment in that the display system SY further includes a projector PJ2 and fourth to sixth reflecting mirrors M4 to M6. In the present embodiment, the projector PJ1 functions as a first projector, and the projector PJ2 functions as a second projector. When the projector PJ1 projects an image on the screen SC1, the light is incident on the liquid crystal layer 30 from the first projection plane SU1 side. On the other hand, when the projector PJ2 projects an image on the screen SC1, the light is incident on the liquid crystal layer 30 from the second projection plane SU2 side.

The controller CON is configured to control interlocking driving of the projector PJ1, the projector PJ2, and the screen SC1. The controller CON can drive projector PJ1 and projector PJ2, and can project the image CH simultaneously on both sides of the screen SC1 from both sides of the screen SC1 during the period in which the image CH is projected on the screen SC1. For example, the controller CON projects the identical image from the projector PJ1 and the projector PJ2 onto the screen SC1, and performs adjustment so that the image CH projected by the projector PJ1 and performs adjustment the image CH projected by the projector PJ2 are plane-symmetrical on the screen SC1.

Figure 16:
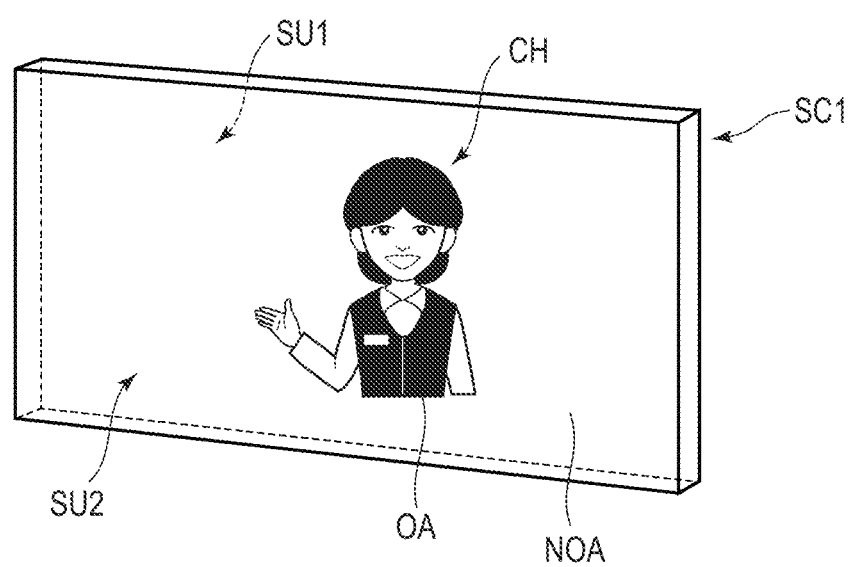
FIG. 16 is a perspective view showing a screen of the display system according to the third embodiment, and is a view of the screen viewed from a second projection plane side.

As a result, for example, a user who visually recognizes the screen SC1 from the first projection plane SU1 side can easily visually recognize the image CH projected on the screen SC1 (FIG. 12), and a user who visually recognizes the screen SC1 from the second projection plane SU2 side can also easily visually recognize the image CH projected on the screen SC1 (FIG. 16).

It should be noted that the image CH projected by the projector PJ1 on the screen SC1 and the image CH projected by the projector PJ2 on the screen SC1 do not have to be the identical, and may be different from each other.

As mentioned above by simultaneously projecting the image CH from both sides of the screen SC1 on both sides of the screen SC1, it is possible to display the image CH having high color reproducibility and a high brightness level even when the screen SC1 is viewed from either side. As a result, the image having the approximately equal quality can be displayed on both sides of the screen SC1. For this reason, for example, the applicable range of the display system SY in outdoor signage applications can be further expanded.

The third embodiment described above can have at least the same effect as the second embodiment.

(Fourth Embodiment)

Next, a display system SY according to the fourth embodiment will be described. FIG. 17 is a cross-sectional view showing the display system SY according to the fourth embodiment.

As shown in FIG. 17, the display system SY of the present embodiment is applied to a vehicle-mounted head-up display (HUD), which has been increasingly adopted in recent years.

As shown in FIG. 18, in the present embodiment as well, only the target areas OA1, OA2, and OA3 in which the image (video) is displayed are switched to the scattering state, and the non-target area NOA is set in a transparent state. In the target areas OA1, OA2, and OA3, the light scattering degree is also controlled.

Figure 19:
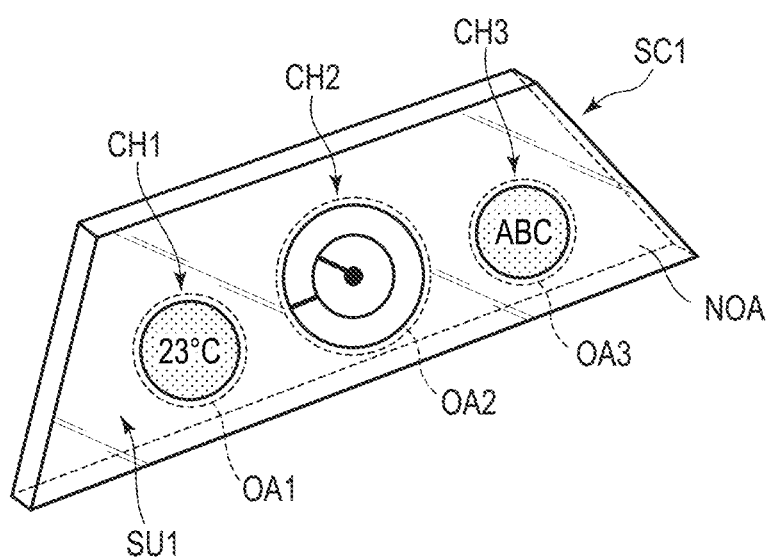
FIG. 19 is a diagram showing a state in which the projector projects an image on the screen shown in FIG. 17 and displays the images in the first target area, the second target area, and the third target area of the screen.

For this reason, as shown in FIG. 19, the display system SY of the present embodiment can display images (moving images) CH1, CH2, and CH3 effective even in an environment where the external light is strong during the daytime. In other words, it is possible to avoid a situation in which it is difficult for the user to visually recognize the images (moving images) CH1, CH2, and CH3 in an environment with strong external light.

The fourth embodiment described above can have at least the same effect as the second embodiment.

(Fifth Embodiment)

Next, a display system SY according to the fifth embodiment will be described. In the first to fourth embodiments described above, a case where a screen SC1 is configured by an active-matrix liquid crystal display panel is described as an example. However, in the present embodiment, the screen SC1 is configured by a liquid crystal display panel that is not an active matrix type. FIG. 20 is a plan view showing a first substrate SUB1 of the screen SC1 of the display system SY according to the fifth embodiment, and is a diagram showing various electrodes EL and a plurality of wiring lines WL.

As shown in FIG. 20, the first substrate SUB1 of the present embodiment includes a plurality of electrodes EL with a specific shape, and a plurality of wiring lines WL connected one-to-one to the electrodes EL instead of a plurality of gate lines G, a plurality of source lines S, a plurality of switching elements SW, and a plurality of matrix-shaped pixel electrodes 11. The plurality of electrodes EL includes an electrode EL1 located in the target area OA1, an electrode EL2 located in the target area OA2, an electrode EL3 located in the target area OA3, and a plurality of electrodes ELs1 to ELs7 for the 7-segment display. In the screen SC1, the area where each of the electrodes ELs1 to ELs7 is located is the target area OA. The seven electrodes ELs1 to ELs7 form an electrode group ELG. In the present embodiment, five electrode groups ELG are disposed unidirectionally.

The common electrode 21 faces a plurality of electrodes EL. Though not illustrated in the drawing, the liquid crystal layer 30 is located only in each target area OA and is not located in the non-target area NOA. In other words, the liquid crystal layer 30 is intermittently located only in the area facing each electrode EL. However, when the liquid crystal layer 30 includes the R-PDLC, the liquid crystal layer 30 may be located in the area facing the common electrode 21, and in this case, the liquid crystal layer 30 may be located in the non-target area NOA.

In the HUD, it is expected to be mainly used as a vehicle-mounted center information display (CID). For this reason, the controller CON may drive the electrode EL having a specific shape and control only the light scattering degree of the area where the electrode EL is located.

It should be noted that the area in which the projector PJ1 projects an image is only the target area OA of the screen SC1. In other words, the electrode EL is disposed only in the area where the projector PJ1 can project an image, and the above area is set as the target area. Also, in the present embodiment, a desired image can be displayed on the screen SC1. In addition, in the present embodiment, since part of the first substrate SUB1 can be replaced with a plurality of electrodes EL and a plurality of wiring lines WL, the structure of the first substrate SUB1 can be simplified, compared with that of the first to fourth embodiments described above. As a result, the manufacturing cost can be significantly reduced. The fifth embodiment described above can have the same effect as the first embodiment.

(Sixth Embodiment)

Figure 21:
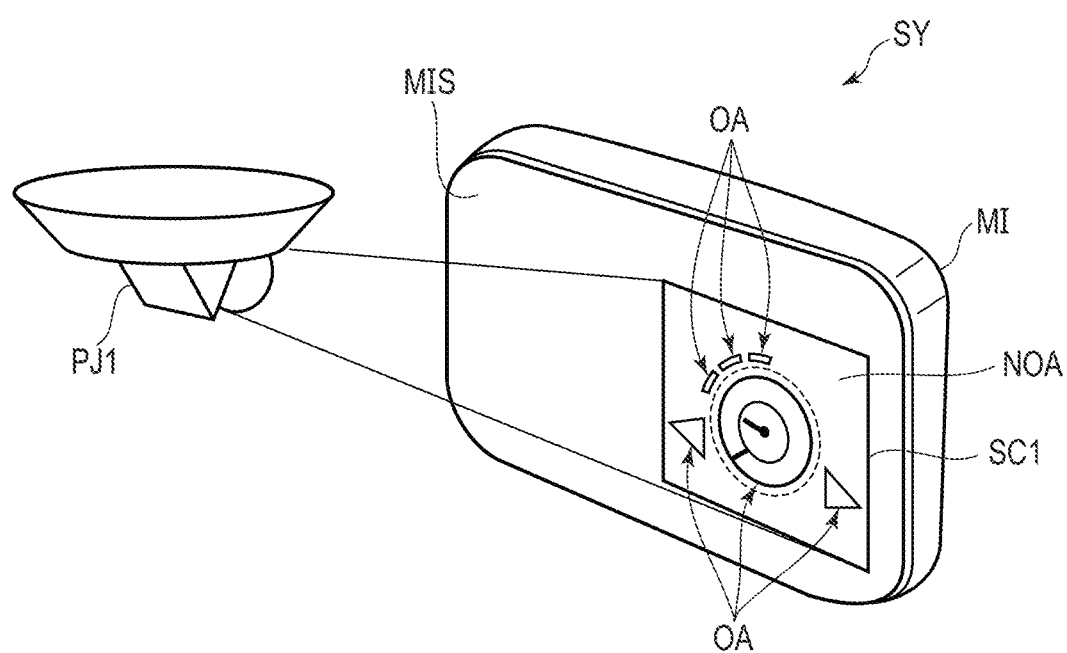
FIG. 21 is a perspective view showing a screen, a projector, and a mirror of a display system according to the sixth embodiment, and is a diagram showing a state in which the screen is sticked on the mirror surface of the mirror, and the projector is projecting an image on the screen.

Next, a display system SY according to the sixth embodiment will be described. FIG. 21 is a perspective view showing a screen SC1, a projector PJ1, and a mirror MI of the display system SY according to the sixth embodiment, and is a diagram showing a state in the screen SC1 is sticked on the mirror surface MIS of the mirror MI, and the projector PJ1 projects an image on the screen SC1. It should be noted that in FIG. 21, a driver DR1 and a controller CON are not shown.

As shown in FIG. 21, the display system SY of the present embodiment further includes the mirror MI. The mirror MI of the present embodiment is a vehicle-mounted rear-view mirror. The screen SC1 is sticked on a mirror surface MIS of the mirror MI. The controller CON can increase the light scattering degree only in the area where the image projected by the projector PJ1 is to be displayed (target area OA) and decrease the light scattering degree in the non-target area NOA. As a result, it is possible to achieve both the display of the image in the target area OA and the original function of the mirror MI (specular reflection in the area of the mirror surface MIS where the screen SC1 is not sticked or the non-target area NOA).

The display system SY of the present embodiment can exert the original function of the mirror MI. For this reason, as compared with the case where the entire rear-view mirror is completely monitored, the user can visually recognize the video (image) without substantially delay.

The sixth embodiment described above can have the same effect as the first embodiment.

(Seventh Embodiment)

Figure 22:
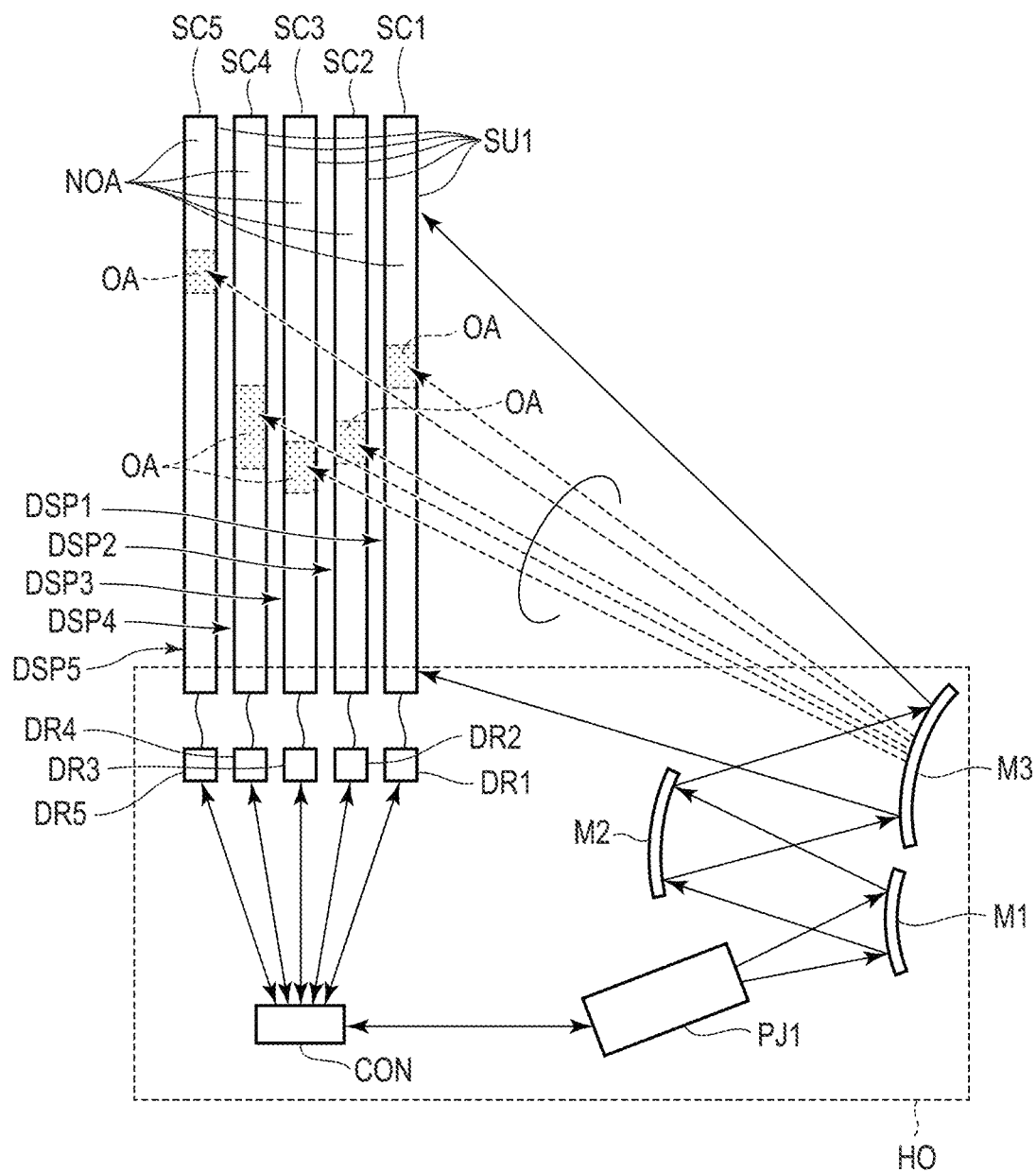
FIG. 22 is a cross-sectional view showing a display system according to the seventh embodiment, and is a diagram showing a state in which the display system includes a plurality of screens.

Next, a display system SY according to the seventh embodiment will be described. FIG. 22 is a cross-sectional view showing the display system SY according to the seventh embodiment, and is a diagram showing a state in which the display system SY includes a plurality of screens SC1, SC2, SC3, SC4, and SC5.

As shown in FIG. 22, the display system SY is different from the second embodiment described above in that it includes a plurality of light scattering devices DSP1, DSP2, DSP3, DSP4, and DSP5. For example, the display system SY includes the plurality of screens SC1, SC2, SC3, SC4, and SC5 including the screen SC1. The light scattering device DSP1 includes the transparent screen SC1 and a driver DR1. The light scattering device DSP2 includes the transparent screen SC2 and a driver DR2. The light scattering device DSP3 includes the transparent screen SC3 and a driver DR3. The light scattering device DSP4 includes the transparent screen SC4 and a driver DR4. The light scattering device DSP5 includes the transparent screen SC5 and a driver DRS.

Each screen SC1, SC2, SC3, SC4, and SC5 has a first projection plane SU1 as a projection plane. The plurality of screens SC1, SC2, SC3, SC4, and SC5 are overlapped and disposed so that each first projection plane SU1 face the identical direction. The controller CON is configured to control interlocking driving of the projector PJ1 and the plurality of screens SC1, SC2, SC3, SC4, and SC5.

The controller CON projects an image on the plurality of first projection planes SU1 of the plurality of screens SC1, SC2, SC3, SC4, and SC5 in a time-division manner, and is configured to switch the plurality of screens SC1, SC2, SC3, SC4, and SC5 to the scattering state in a time-division manner while setting them in a transparent state.

During the period in which an image is projected on the plurality of screens SC1, SC2, SC3, SC4, and SC5, the controller CON switches the target area OA in which the image is projected in one screen SC or several screens SC of the plurality of screens SC1, SC2, SC3, SC4, and SC5 to the scattering state, controls the light scattering degree of the target area OA, and sets the non-target area NOA in a transparent state. The controller CON sets the remaining screens SC, of the plurality of screens SC1, SC2, SC3, SC4, and SC5, that do not include the target area OA to a transparent state.

For example, during the period in which only screen SC1 includes the target area OA, and the remaining screens SC2, SC3, SC4, and SC5 do not include the target area OA, the controller CON controls the light scattering degree of the target area OA of the screen SC1, and sets the non-target area NOA of screen SC1 and the entire screens SC2, SC3, SC4, and SC5 to a transparent state.

According to the display system SY of the seventh embodiment configured as described above, the plurality of screens SC1, SC2, SC3, SC4, and SC5 are disposed in a direction perpendicular to the first projection plane SU1, for example. By disposing the plurality of screens SC1, SC2, SC3, SC4, and SC5, the display system SY can have information in the depth direction. In addition, the projector PJ1 and a plurality of screens SC1, SC2, SC3, SC4, and SC5 can be driven in conjunction with each other by time-division drive. The projector PJ1 can project an image (video) having information in the depth direction according to the time-division operation of the screens SC1, SC2, SC3, SC4, and SC5.

By controlling the information in the depth direction of the plurality of screens SC1, SC2, SC3, SC4, and SC5 as dimensions in the direction perpendicular to the first projection plane SU1 which is a plane, the image can be displayed in three dimensions.

The seventh embodiment described above can have the same effect as the second embodiment. It should be noted that the display system SY may include 2 to 4 or 6 or more screens SC.

(Eighth Embodiment)

Figure 23:
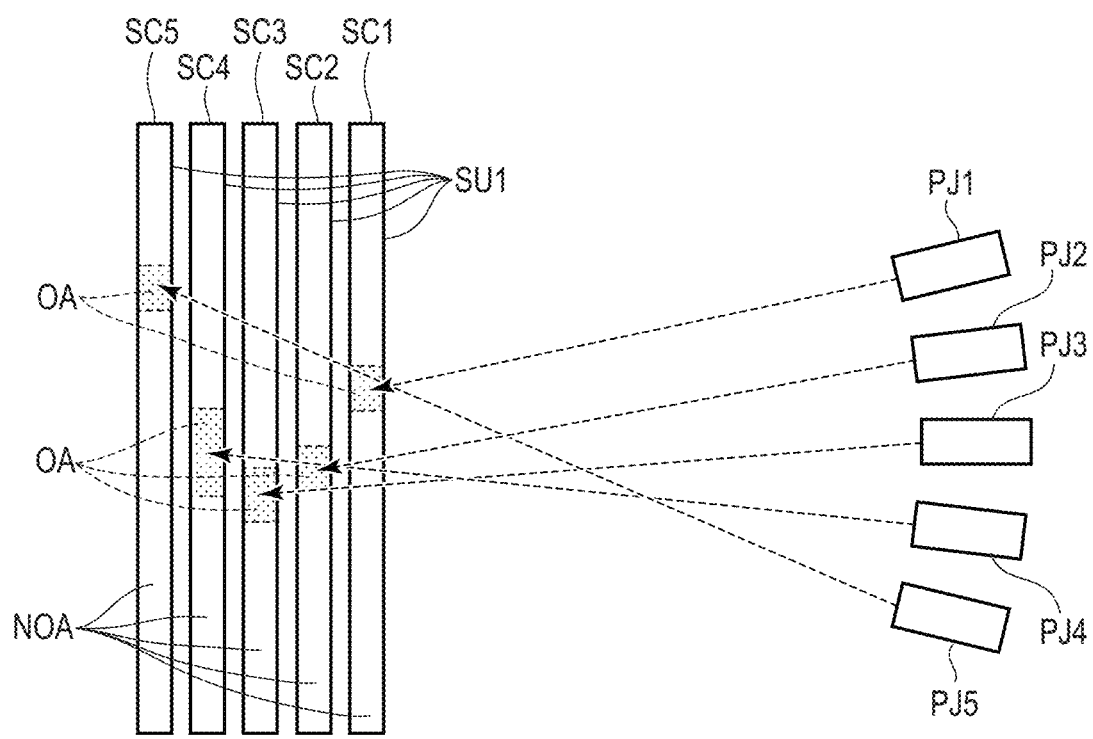
FIG. 23 is a cross-sectional view showing a plurality of screens and a plurality of projectors of a display system according to the eighth embodiment.

Next, a display system SY according to the eighth embodiment will be described. FIG. 23 is a cross-sectional view showing a plurality of screens SC1, SC2, SC3, SC4, and SC5 and a plurality of projectors PJ1, PJ2, PJ3, PJ4, and PJ5 of the display system SY according to the eighth embodiment. It should be noted that FIG. 23 shows only the plurality of screens SC and the plurality of projectors PJ of the display system SY.

As shown in FIG. 23, the display system SY is different from the seventh embodiment described above in that it includes the plurality of projectors PJ1, PJ2, PJ3, PJ4, and PJ5. The plurality of projectors PJ1, PJ2, PJ3, PJ4, and PJ5 corresponds one-to-one to the plurality of screens SC1, SC2, SC3, SC4, and SC5, and the focus is on the corresponding screens SC1, SC2, SC3, SC4, and SC5. In the present embodiment, the projector PJ1 is focused on the screen SC1, the projector PJ2 is focused on the screen SC2, the projector PJ3 is focused on the screen SC3, the projector PJ4 is focused on the screen SC4, and the projector PJ5 is focused on the screen SC5.

The controller CON is configured to control interlocking driving of the plurality of projectors PJ1, PJ2, PJ3, PJ4, and PJ5 and the plurality of screens SC1, SC2, SC3, SC4, and SC5. The controller CON drives the plurality of projectors PJ1, PJ2, PJ3, PJ4, and PJ5 in a time-division manner, projects images on the corresponding screens SC1, SC2, SC3, SC4, and SC5 in a time-division manner, switches the plurality of screens SC1, SC2, SC3, SC4, and SC5 to the scattering state in a time-division manner while setting them in a transparent state.

According to the display system SY of the eighth embodiment configured as described above, the display system SY includes the plurality of projectors PJ1, PJ2, PJ3, PJ4, and PJ5. Each of the projectors PJ1, PJ2, PJ3, PJ4, and PJ5 is substantially focused on the corresponding single screens SC. For this reason, in the present embodiment, an image having higher display quality can be displayed as compared with that of the seventh embodiment.

The eighth embodiment described above can have the same effect as the seventh embodiment. It should be noted that the display system SY may include 2 to 4 or 6 or more projectors PJ.

(Ninth Embodiment)

Figure 24:
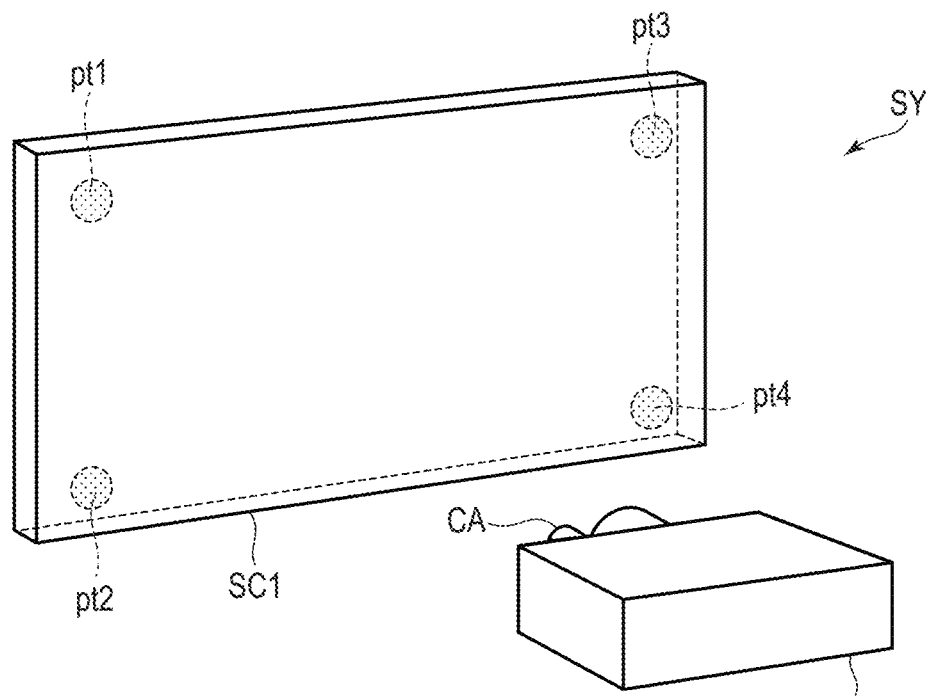
FIG. 24 is a perspective view showing a screen and a projector of the display system according to the ninth embodiment, and is a diagram showing a state in the pattern on the screen above is monitored, and the information of the distance from the projector to the screen, and the angle at which the image is projected from the projector on the screen is acquired.

Next, a display system SY according to the ninth embodiment will be described. FIG. 24 is a perspective view showing the screen SC and the projector PJ1 of the display system SY according to the ninth embodiment, and is a diagram showing a state in the pattern on the screen SC1 is monitored, and the information of the distance from the projector PJ1 to the screen SC1 and the angle at which an image is projected from the projector PJ1 to the screen SC1 is acquired. It should be noted that FIG. 24 shows only the screen SC1 and the projector PJ1 of the display system SY.

As shown in FIG. 24, the controller CON of the present embodiment is configured to adjust the size and the shape of the image on the screen SC1 based on the distance from the projector PJ1 to the screen SC1 and the angle at which the image is projected from the projector PJ1 to the screen SC1.

In the present embodiment, the projector PJ1 has a camera CA. The controller CON is configured to monitor one or a plurality of patterns pt of any shape on the screen SC1 using the camera CA and acquire information on the distance and the angle. In the present embodiment, the pattern pt is four patterns pt1, pt2, pt3, and pt4 located at the four corners of the screen SC1. When the controller CON monitors the patterns pt1, pt2, pt3, and pt4, it can display the patterns pt1, pt2, pt3, and pt4 on the screen SC1 by making the light scattering degree of the screen SC1 partially different. For example, only the area, of the screen SC1, where the patterns pt1, pt2, pt3, and pt4 are displayed may be adjusted to have a high light scattering degree, and the remaining area may be set in a transparent state.

The ninth embodiment described above can have the same effect as the first embodiment.

(Tenth Embodiment)

Figure 25:
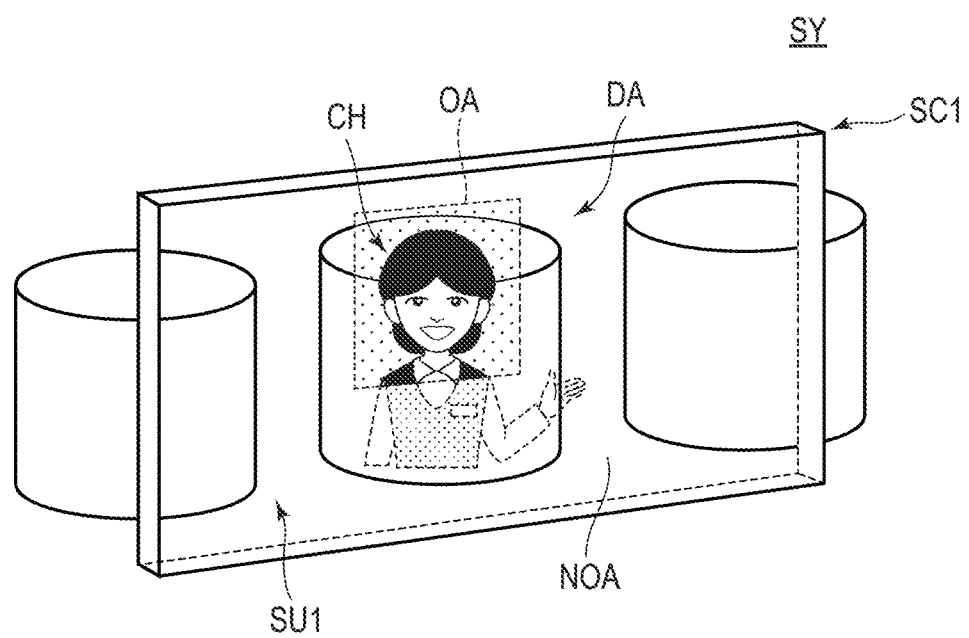
FIG. 25 is a perspective view showing a screen of a display system according to the tenth embodiment, and is a diagram showing a state in which the light scattering degree of part of the area, of the screen, in which an image is projected is controlled.

Next, a display system SY according to the tenth embodiment will be described. FIG. 25 is a perspective view showing the screen SC1 of the display system SY according to the tenth embodiment, and is a diagram showing a state in which the light scattering degree of part of the area, of the screen SC1, where the image is projected is controlled. It should be noted that FIG. 25 shows only the screen SC1 of the display system SY.

As shown in FIG. 25, the controller CON of the present embodiment is configured to drive the screen SC1 and control the light scattering degree of at least part of the area, of the screen SC1, in which the image is projected during a period in which the projector PJ1 is driven and the image is projected on the screen SC1. In the present embodiment, the target area OA and the image CH on the screen SC1 are not identical in position, size, and shape. In the example of FIG. 25, the target area OA includes part of the area where the image CH is projected on the screen SC1 and the area around part of the area where the image CH is projected.

According to the display system SY of the tenth embodiment configured as described above, part of the area, of the screen SC1, in which the image CH is projected can be switched to the scattering state. For this reason, in the target area OA, the image CH projected on the screen SC1 can be easily visually recognized by the user.

The tenth embodiment described above can have the same effect as the first embodiment.

Comparative Example 1

Next, a display system SY according to the comparative example 1 will be described. FIG. 26 is a perspective view showing a screen SC1 and a projector PJ1 of the display system SY according to the comparative example 1, and is a diagram showing a state in the overall light scattering degree of a display area DA of the screen SC1 is set high, a projector PJ1 projects an image CH on the screen SC, and the image CH is displayed in the target area OA of the screen SC1.

As shown in FIG. 26, in the comparative example 1, for example, the screen SC1 can be disposed outdoors when using the display system SY. The screen SC1 of the comparative example 1 is formed by dispersing a light scattering material in a transparent base material including a transparent resin such as acrylic. The screen SC1 of the comparative example 1 is constantly in a scattering state. For this reason, it is not necessary to drive the screen SC1, and the display system SY is configured without the driver DR1.

As described above, the screen SC1 of the comparative example 1 is constantly in a scattering state and not in a transparent state. For this reason, in the case of comparative example 1, it is difficult to visually recognize the background through the screen SC1. In addition, when the screen SC1 is exposed to direct sunlight or a strong environment, the image projected on the screen SC1 is canceled by natural light, and as a result, it is extremely difficult for the user to recognize the image.

From the above, in the comparative example 1, it is difficult to obtain a display system capable of improving the visibility of the background and the display quality.

Comparative Example 2

Next, a display system SY according to the comparative example 2 will be described. FIG. 27 is a perspective view showing a screen SC1 and a projector PJ1 of the display system SY according to the comparative example 2, and is a diagram showing a state in which the overall light scattering degree of a display area DA of the screen SC1 is set low, projector PJ1 projects an image CH onto the screen SC1, and the image CH is displayed in the target area OA of the screen SC1.

As shown in FIG. 27, the display system SY of the comparative example 2 is different from the display system SY of the comparative example 1 in that the concentration of the light scattering material on the screen SC1 is low. The light scattering degree of the screen SC1 of the comparative example 2 is lower than the light scattering degree of the screen of the comparative example 1 above. For this reason, the screen SC1 of the comparative example 2 has higher transparency than that of the comparative example 1. It is easy to visually recognize the background through the screen SC1 as compared with the comparative example 1 above.

However, the brightness level of the image CH projected on the screen SC1 is lower than that of the comparative example 1. For example, it tends to be difficult for the user to visually recognize the image CH projected on the screen SC1 outdoors.

From the above, in the comparative example 2, it is difficult to obtain a display system capable of improving the visibility of the background and the display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. It is also possible to combine a plurality of embodiments as needed.

For example, the liquid crystal layer 30 may include a normal type polymer-dispersed liquid crystal. The liquid crystal layer 30 maintains the parallelism of the incident light when the applied voltage is high, and scatters the incident light when the applied voltage is low.

The screen SC my not be a liquid crystal display panel, as long as the transparent state and the scattering state can be adjusted for each area. For example, the screen SC may be an electrophoretic display panel. In this case, the screen SC has a plurality of electrophoretic elements that switches between a transparent state and a scattering state.

What is claimed is:

1. A display system comprising:
a transparent screen that is capable of switching a light scattering degree;
a first projector that projects a first image on the transparent screen;
a second projector that projects a second image on the transparent screen; and
a controller,
wherein
the controller controls interlocking driving of the first projector, the second projector, and the screen,
the controller drives the transparent screen and controls a light scattering degree of at least part of an area of the transparent screen in which the first image or the second image is projected during a period in which the first projector or the second projector is driven and the first image or the second image is projected on the transparent screen, and
the controller drives the first projector and the second projector to simultaneously project the first image and the second image on both sides of the transparent screen during the period.

2. The display system of claim 1, wherein
during the period, the controller
switches a target area, of the transparent screen, in which the first image or the second image is projected in a scattering state, controls a light scattering degree of the target area, and
sets a non-target area other than the target area of the transparent screen in a transparent state.

3. The display system of claim 2, wherein
during the period, the controller
adjusts a position, a size, and a shape of the target area in association with the first image or the second image on the transparent screen.

4. The display system of claim 3, wherein
during the period, the controller
performs adjustment so that the target area is identical to the first image or the second image on the transparent screen in position, size, and shape.

5. The display system of claim 3, wherein
during the period, the controller
performs adjustment so that a shape of the target area is similar to a shape of the first image or the second image on the transparent screen, and
performs adjustment so that a size of the target area is larger than a size of the first image or the second image on the transparent screen.

6. The display system of claim 1, wherein
during the period, the controller
projects the identical image on the transparent screen from the first projector and the second projector, and
performs adjustment so that the first image projected by the first projector and the second image projected by the second projector are plane-symmetrical on the transparent screen.

7. The display system of claim 1, further comprising:
a mirror,
wherein
the transparent screen sticks on a mirror surface of the mirror.

8. The display system of claim 1, wherein
the transparent screen includes a display area in which a first image or the second image is projected, a plurality of pixel electrodes located in the display area and provided in a matrix, a common electrode located in the display area, and a display function layer located in the display area, and
the controller drives the common electrode, individually drives the pixel electrodes, and switches the display function layer between a transparent state and a scattering state by applying a voltage applied between the common electrode and the pixel electrodes to the display function layer.

9. The display system of claim 1, wherein
the transparent screen includes a display function layer that is configured to switch between a transparent state and a scattering state, and
the display function layer is a liquid crystal layer including a reverse mode polymer-dispersed liquid crystal.

10. The display system of claim 1, wherein
the transparent screen includes a plurality of electrophoretic elements that switches between a transparent state and a scattering state.

11. A display system comprising:
a screen that is capable of switching a light scattering degree;
a projector;
a controller that controls interlocking driving of the projector and the screen; and
a plurality of screens including the screen, each of the screens having a projection plane,
wherein
the controller drives the screen and controls a light scattering degree of at least part of an area of the screen in which an image is projected during a period in which the projector is driven, and the image is projected on the screen,
the screens are stacked and disposed so that the each projection plane Cake faces an identical direction, and
the controller
controls interlocking driving of the projector and the screens, projects the image on the projection planes of the screens in a time-division manner, and switches the screens to a scattering state in a time-division manner, while setting the screens in a transparent state.

12. The display system of claim 11, wherein
during the period, the controller
switches a target area in which the image is projected to the scattering state, controls a light scattering degree of the target area, and sets a non-target area other than the target area in the transparent state in one screen or each of several screens of the screens, and
sets a remaining screen, of the screens, that does not include the target area in the transparent state.

13. The display system of claim 11, further comprising:
a plurality of projectors including the projector, the projectors having one-to-one correspondence with the screens, the projectors being focused on corresponding screens,
wherein
the controller
controls interlocking driving of the projectors and the screens,
drives the projectors in a time-division manner, projects the image on the corresponding screens in a time-division manner, and switches the screens to the scattering state in a time-division manner while setting the screens in the transparent state.

14. A display system comprising:
a screen that is capable of switching a light scattering degree-,
a projector: and
a controller that controls interlocking driving of the projector and the screen,
wherein
the controller drives the screen and controls a light scattering degree of at least part of an area of the screen in which an image is projected during a period in which the projector is driven, and the image is projected on the screen,
the controller adjusts a size and a shape of the image on the screen based on a distance from the projector to the screen and an angle at which the image is projected on the screen from the projector,
the projector includes a camera,
the controller monitors one or a plurality of patterns of an shape on the screen using the camera, and acquires information on the distance and the angle, and
the controller displays the pattern on the screen by making a light scattering degree of the screen partially different when monitoring the pattern.

\* \* \* \* \*